US005352243A

United States Patent [19]

Ashizawa et al.

[11] Patent Number: 5,352,243

[45] Date of Patent: Oct. 4, 1994

[54] METHODS OF ENHANCING PRINTING QUALITY OF PIGMENT COMPOSITIONS ONTO COTTON FABRICS

[75] Inventors: Eunice C. Ashizawa, Oakland; Kathleen A. Clarkson, San Francisco; Pushkaraj J. Lad, San Mateo; Edward Larenas, Moss Beach, all of Calif.

[73] Assignee: Genencor International, Inc., S. San Francisco, Calif.

[21] Appl. No.: 843,589

[22] Filed: Feb. 28, 1992

[51] Int. Cl.[5] .......... C09B 67/00

[52] U.S. Cl. .......... 8/401

[58] Field of Search .......... 8/401

[56] References Cited

U.S. PATENT DOCUMENTS 4,013,405 3/1977 Donenfeld .
4,479,881 10/1984 Tai .......... 252/8.8
4,661,289 4/1987 Parslow et al. .......... 252/8.8
4,738,682 4/1988 Boesh et al. .......... 8/401
4,822,516 4/1989 Suzuki et al. .
4,978,470 12/1990 Suzuki et al. .......... 252/174.12

FOREIGN PATENT DOCUMENTS 0265832 10/1987 European Pat. Off. .
0269977 11/1987 European Pat. Off. .
03241077 10/1991 Japan .
8909259 10/1989 PCT Int'l Appl. .
9105841 5/1991 PCT Int'l Appl. .
WO92/06183 4/1992 PCT Int'l Appl. .
2094826A 3/1982 United Kingdom .

OTHER PUBLICATIONS

Cannon, P. F., International Commission on the Taxonomy of Fungi (ICTF); name changes in fungi of microbiological, industrial and medical importance. Part 2, Microbiological Sciences, 3,9:285–287 (1986).

Chen et al., Biotechnology 5:274–278 (1987).

Maniatis et al., Molecular Cloning, A Laboratory Manual, Second Edition, Cold Spring Harbor Laboratory Press, (1989).

Penttila et al., Gene 45:253–263 (1986).

Primafast Cotton, A New Low-Lint Fabric, Press Release, dated Dec. 7, 1990.

Saloheimo et al., Gene 63:11–21 (1988).

Sheir-Neiss, G. and Montenecourt, B. S., Appl. Microbiol. Biotechnol., 20:46–53 (1984).

Shoemaker et al., "Molecular Cloning of Exo-cellobiohydrolase I Derived from *T. reesei* Strin L27", Bio/Technology, 1:691, 1983.

Smith et al., "Sequence of the Cloned pyr4 gene of *T. reesei* and its use as a Homologous Selectable Marker for Transformation", Current Genetics, 19:27–33 (1991).

van Arsdell et al., Bio/Technology 5:60–64 (1987).

Wilson et al., Nucl. Acids Res. 16:2339 (1988).

Wilson et al., Gene, 77:69–78 (1989).

Yanish-Perron et al., Gene 33:103–119 (1985).

*Primary Examiner*—Paul Lieberman

*Assistant Examiner*—Margaret Einsmann

*Attorney, Agent, or Firm*—Burns, Doane, Swecker & Mathis

[57] ABSTRACT

Disclosed are methods for enhancing the quality of printing on cotton-containing fabrics. Specifically, this methods disclosed herein recite the pretreatment of cotton-containing fabrics with cellulase prior to printing in order to enhance printing characteristics on the fabric such as pigment uptake, enhanced clarity, reduced pigment bleeding, and the like. The methods disclosed herein generally entail treating cotton-containing fabrics with an aqueous cellulase formulation and preferably with an aqueous cellulase solution under agitating conditions.

11 Claims, 8 Drawing Sheets cbh1

SEQ ID NO:1 AAACCCAATAGTCAACCGCGGACTGGCAT ATG TAT CGG

G T A

SEQ ID NO:2 AAACCCAATAGTGATCAGCGGACTGGCAT ATG TAT CGG

BclI First 3 codons egl1

SEQ ID NO:3 TAGTCCTTCTTGTTGTCCCAAA ATG GCG CCC

GGA

SEQ ID NO:4 TAGTCCTTCTTGGGATCCCAAA ATG GCG CCC

BamHI First 3 codons

METHODS OF ENHANCING PRINTING QUALITY OF PIGMENT COMPOSITIONS ONTO COTTON FABRICS

BACKGROUND OF THE INVENTION

1. Field of the Invention

This invention is directed to methods for enhancing the quality of printing on resinated and non-resinated cotton fabrics using a colorant composition containing a pigment. Specifically, this invention is directed to methods of pretreating resinated and non-resinated cotton fabrics with an aqueous cellulase formulation prior to printing an image onto the fabric with a pigment composition so as to enhance printing qualities on the fabric such as pigment uptake. The methods disclosed herein generally entail treating cotton fabrics with an aqueous cellulase formulation followed by drying the fabrics and then printing an image onto the fabrics with a pigment composition.

2. State of the Art

Aesthetic and/or informational images are often placed on cotton fabrics with dye or pigment compositions by methods such as silk screening, painting, etc. While such methodology is well known in the art, these methods entail numerous problems which must be overcome in order to impart and retain quality images on cotton fabrics. Specifically, common with such printing methods is the low level of pigment uptake exhibited by some cotton fabrics. In general, the level of pigment uptake relates to the degree by which the pigment is incorporated (penetrates) into the fabric and can be indirectly measured by the number of passes required for sufficient amounts of the pigment composition to be incorporated into the cotton fabric to provide adequate resolution of the intended image. For some cotton fabrics, three passes are required to provide the desired level of pigment uptake. However, the use of numerous passes to ensure adequate pigment uptake poses problems such as ensuring that the second and additional passes are placed identically over the image created from the first pass so that blurring of the image does not occur.

Still another problem encountered with the methodology used for imparting an image onto a cotton fabric with a pigment composition is the level of adherence of the pigment composition to the fabric. Such adherence relates to the level of pigment incorporation into the fabric after fabric washing. Fabrics having low pigment adherence will exhibit reduced pigment retention after washing.

In any event, these problems impart a significant impediment to providing high quality cotton fabrics having images painted or silk-screened thereon with a pigment composition.

The present invention is directed to the discovery that pretreating cotton fabrics with an aqueous cellulase formulation, preferably under conditions of agitation, prior to printing an image on the fabric with a pigment composition, results in significant and unexpected improvements in the fabric. Specifically, printing images with a pigment composition on cotton fabrics pretreated with cellulase provides for increased pigment uptake by the fabric. In turn, this permits a reduction in the number of passes required to achieve a specific level of pigment uptake; or with the same number of passes as was previously employed with non-treated fabric, an increased amount of pigment is placed onto the fabric.

Additionally, the increased pigment uptake by the cellulase treated fabric is reflected in both the non-washed and washed fabrics (i.e., fabrics which after treatment with the pigment composition are washed in an aqueous detergent composition). The latter fact demonstrates that with cellulase treated fabrics, the pigment adheres strongly to the fabric.

While treatment of cotton fabrics with an aqueous cellulase formulation (including treatment under agitation) has heretofore been suggested in the art, there appears to be no suggestion in the art of using such conditions as a pretreatment for printing processes such as silk-screening and painting, using a pigment composition.

SUMMARY OF THE INVENTION

This invention is directed to printing methods for imparting an image onto a cotton-containing fabric which methods enhance the quality of printing with a pigment composition on such cotton-containing fabrics. The methods of this invention entail the pretreatment of the cotton-containing fabric with an aqueous cellulase formulation prior to printing an image onto the fabric with a pigment composition.

Accordingly, in one of its method aspects, the present invention is directed to a method for printing an image onto a cotton-containing fabric with a pigment composition which method comprises the steps of:

(a) contacting a cotton-containing fabric with an aqueous formulation comprising at least about 50 ppm of cellulase proteins at a temperature of from about 25° C. to about 70° C. for at least 0.1 hours wherein the aqueous formulation is maintained at a pH where the cellulase has activity;

(b) inactivating the cellulase proteins from the cotton-containing fabric by washing the fabric with water maintained at a temperature of at least about 75° C.;

(c) drying the fabric; and (d) printing an image on the fabric with a pigment composition.

The improvements in print quality seen in the examples of this invention include, for example, increased pigment uptake, increased pigment adherence and reduced pigment bleeding.

In a preferred embodiment, the aqueous cellulase formulation is an aqueous cellulase solution which is agitated during contact with the cotton-containing fabric.

In another preferred embodiment, cellulase, including cellulase proteins, is inactivated on the cotton-containing fabric before printing an image on the fabric. Inactivation of the cellulase can be accomplished either in a step separate from the drying step or the cellulase can be inactivated during the drying step by employing drying conditions sufficient to inactivate the cellulase.

In one of its composition aspects, the present invention is directed to cotton-containing fabrics prepared in the methods described herein.

BRIEF DESCRIPTION OF THE DRAWINGS

In FIG. 5, the right hand side of the figure is marked to indicate the location of the single proteins found in one or more of the secreted proteins. Specifically, BG refers to the β-glucosidase, E1 refers to endoglucanase I, E2 refers to endoglucanase II, E3 refers to endoglucanase III, C1 refers to exo-cellobiohydrolase I and C2 refers to exo-cellobiohydrolase II.

DETAILED DESCRIPTION OF THE INVENTION

Figure 1:
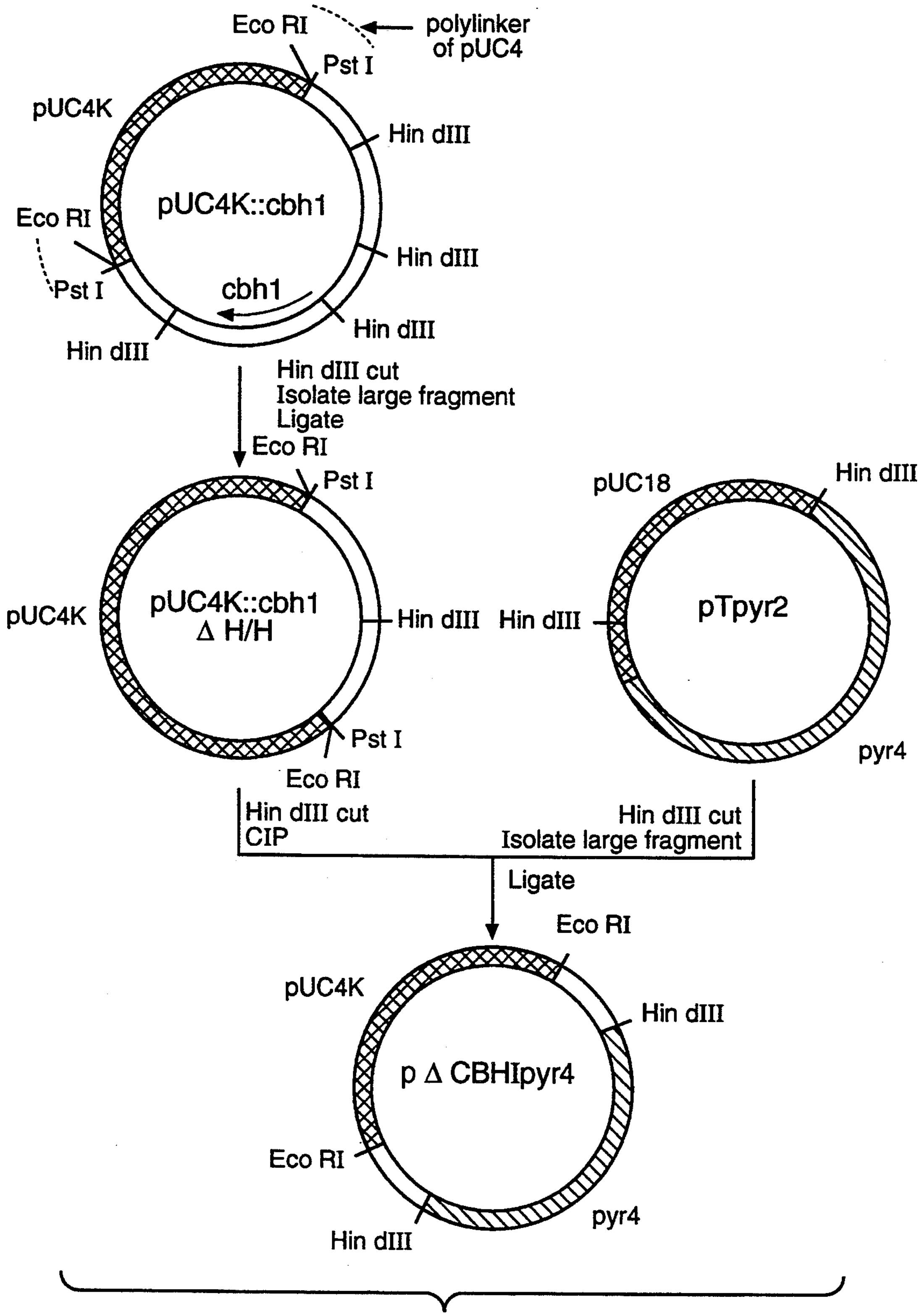
FIG. 1 is an outline of the construction of pΔCBHIpyr4.

As noted above, the present invention is directed to methods which enhance the quality of printing on cotton-containing fabrics with a pigment composition. The methods of this invention entail the pretreatment of the fabric with an aqueous cellulase formulation, preferably in an aqueous cellulase solution under conditions which agitate the fabric in solution. However, prior to discussing this invention in further detail, the following terms will first be defined:

1. Definitions

As used herein, the following terms will have the following meanings:

The term "cotton-containing fabric" refers to resinated and non-resinated fabrics made of pure cotton or cotton blends including cotton woven fabrics, cotton knits, cotton denims, cotton yarns and the like. When cotton blends are employed, the amount of cotton in the fabric should be at least about 40 percent by weight cotton; preferably, more than about 60 percent by weight cotton; and most preferably, more than about 75 percent by weight cotton. When employed as blends, the companion material employed in the fabric can include one or more non-cotton fibers including synthetic fibers such as polyamide fibers (for example, nylon 6 and nylon 66), acrylic fibers (for example, polyacrylonitrile fibers), and polyester fibers (for example, polyethylene terephthalate), polyvinyl alcohol fibers (for example, Vinylon), polyvinyl chloride fibers, polyvinylidene chloride fibers, polyurethane fibers, polyurea fibers, aramid fibers, and the like.

The term "resin" or "resinous finish" employed herein refers to those commonly employed and well known resin finishes which impart desirable improvements to cotton fabrics including cotton fabrics made of pure cotton or cotton blends. Such resins generally employ formaldehyde and include, by way of example, methylol urea (which is a monomeric condensation product of urea and formaldehyde), melamine formaldehyde, and the like. When employed on cotton fabrics, such resins impart one or more desirable properties to the fabric including wrinkle resistance, shrinkage control, durable embossing, durable glazing, and the like.

Cotton fabrics which include such a resin are referred to as "resinated cotton-containing fabrics" whereas cotton fabrics which do not include such a resin are referred to as "non-resinated cotton-containing fabrics".

The term "cellulase" as employed herein refers to an enzyme composition derived from a microorganism which acts on cellulose and/or its derivatives (e.g., phosphoric acid swollen cellulose) to hydrolyze cellulose and/or its derivatives and give primary products, including glucose and cellobiose. Such cellulases are synthesized by a large number of microorganisms including fungi, actinomycetes, gliding bacteria (mycobacteria) and true bacteria. Some microorganisms capable of producing cellulases useful in the methods recited herein are disclosed in British Patent No. 2 094 826A, the disclosure of which is incorporated herein by reference. Most cellulases generally have their optimum activity against cellulose and/or its derivatives in the acidic or neutral pH range. On the other hand, alkaline cellulases, i.e., cellulases showing optimum activity against cellulose and/or its derivatives in neutral or alkaline media, are also known in the art. Microorganisms producing alkaline cellulases are disclosed in U.S. Pat. No. 4,822,516, the disclosure of which is incorporated herein by reference. Other references disclosing alkaline cellulases are European Patent Application Publication No. 269,977 and European Patent Application Publication No. 265,832, the disclosures of which are also incorporated herein by reference.

Cellulase produced by a microorganism is sometimes referred to herein as a "cellulase system" to distinguish it from the classifications and components isolated therefrom. Such classifications are well known in the art and include exo-cellobiohydrolases ("CBH"), endoglucanases ("EG") and β-glucosidases ("BG"). Additionally, there can be multiple components in each classification. For example, in the cellulase obtained from *Trichoderma longibrachiatum,* there are at least two CBH components, i.e., CBH I and CBH II, and at least three EG components, EG I, EG II and EG III.

The different classifications are known in the art to synergistically interact with each other to provide enhanced activity against cellulose. Thus, while a cellulase system derived from any microorganism can be employed herein, it is preferred that the cellulase system contain at least one CBH component and at least one EG component so that enhanced cellulase activity is achieved.

A preferred cellulase composition for use in this invention is one produced from a fungal source. A particularly preferred fungal cellulase composition for use in this invention is one produced by a naturally occurring fungal source and which comprises one or more CBH and EG components wherein each of these components is found at the ratio produced by the fungal source. Such compositions are sometimes referred to herein as complete fungal cellulase systems or complete fungal cellulase compositions to distinguish them from the classifications and components of cellulase isolated therefrom, from incomplete cellulase compositions produced by bacteria and some fungi, or from a cellulase composition obtained from a microorganism genetically modified so as to overproduce, underproduce or not produce one or more of the CBH and/or EG components of cellulase. The use of such complete fungal cellulase compositions appears to provide for optimal results in improving the quality of printing on cotton-containing fabrics with a pigment composition.

On the other hand, it is contemplated that some components or combination of components of cellulase may provide for improvements in the treatment of cotton-containing fabrics. For example, CBH deficient/EG enriched cellulase compositions can be used so as to provide reduced strength loss in the cotton-containing fabric while also providing for the improvements recited herein. See, for example, U.S. Ser. Nos. 07/677,385 and 07/678,865 which are incorporated herein by reference in their entirety. Additionally, it appears that CBH enriched cellulase compositions may provide for improved pigment uptake as compared to the pigment uptake in a non-cellulase treated fabric.

Methods for preparing CBH deficient and CBH enriched cellulases from *Trichoderma longibrachiatum* are recited in U.S. Ser. No. 07/770,049 filed on Oct. 4, 1991 as Attorney Docket No. 010055-076 and entitled "*Trichoderma reesei* CONTAINING DELETED AND/OR ENRICHED CELLULASE AND OTHER ENZYME GENES AND CELLULASE COMPOSITIONS DERIVED THEREFROM". This application is incorporated herein by reference in its entirety. Similarly, methods to genetically manipulate *Aspergillus nidulans* which methods can be employed to prepare CBH deficient and CBH enriched cellulases in *Aspergillus nidulans* are disclosed by Miller et al., Molecular and Cellular Biology, Vol. 5, No. 7, pp. 1714–1721 (1985) which is incorporated herein by reference in its entirety. Such CBH deficient and CBH enriched cellulases can be used as cellulase compositions in the methods described herein.

It is also contemplated that treatment of cotton-containing fabrics with cellulase as per this invention may be enhanced by use of a cellulase composition containing enhanced or deficient amounts of β-glucosidase. Methods of modifying a microorganism to provide for enhanced or deficient amounts of β-glucosidase are disclosed in U.S. Ser. No. 07/807,028 filed on Dec. 10, 1991 as Attorney Docket No. 010055-077 and entitled "IMPROVED SACCHARIFICATION OF CELLULASE BY CLONING AND AMPLIFICATION OF THE β-GLUCOSIDASE GENE OF *Trichoderma reesei*". This application is incorporated herein by reference in its entirety.

The fermentation procedures for culturing cellulolytic microorganisms for production of cellulase are known per se in the art. For example, cellulase systems can be produced either by solid or submerged culture, including batch, fed-batch and continuous-flow processes. The collection and purification of the cellulase systems from the fermentation broth can also be effected by procedures known per se in the art.

Preferred fungal cellulases for use in this invention are those obtained from *Trichoderma longibrachiatum, Trichoderma koningii, Pencillum sp., Humicola insolens,* and the like. Certain cellulases are commercially available, i.e., CELLUCAST (available from Novo Industry, Copenhagen, Denmark), RAPIDASE (available from Gist Brocades, N.V., Delft, Holland), CYTOLASE 123 (available from Genencor International, Inc., Rochester, N.Y.) and the like. Other cellulases can be readily isolated by art recognized fermentation and isolation procedures.

The term "cellulase proteins" refer to any and all exo-cellobiohydrolase (CBH) proteins, endoglucanase (EG) proteins and β-glucosidase (BG) proteins contained in the cellulase composition. Accordingly, cellulase proteins do not include other proteins such as xylanases, proteases, amylases, etc.

This invention is further directed to the discovery that it is the amount of cellulase proteins which are active on cotton fabrics and not their specific activities on synthetic substrates which provide the improvements to the cotton-containing fabrics with regard to printing.

The term "surface active agent or surfactant" refers to anionic, non-ionic and cationic surfactants well known in the art.

The term "buffer" refers to art recognized acid/base reagents which stabilize the cellulase solution against undesired pH shifts during the cellulase treatment of the cotton-containing fabric.

The term "aqueous cellulase formulation" means an aqueous formulation containing cellulase and optional additives such as surfactants, buffers, and the like. Such aqueous cellulase formulations include aqueous cellulase solutions, pastes, gels and the like. In general, the aqueous cellulase formulation will contain a sufficient amount of cellulase proteins so as to provide enhancements in printing pigment compositions onto a cotton-containing fabric. Preferably, the aqueous cellulase formulation will contain at least about 50 ppm of cellulase proteins, preferably, from about 50 ppm to about 2000 ppm of cellulase proteins, and more preferably, from about 100 to about 1000 ppm of cellulase proteins.

In all cases where a ppm concentration of cellulase proteins is recited in this application, the ppm of cellulase proteins is based on the total amount of cellulase proteins in the aqueous formulation which amount is determined by first precipitating protein in trichloroacetic acid followed by the Lowry assay as provided by Sigma in Order No. 690-A.

The term "pigment" refers to the well known and art recognized pigments which impart color to another substance and are insoluble in water and in other solvents typically used in dyeing. The particular pigment employed is not critical and is chosen relative to its color and properties. Suitable pigments are well known in the art and include, by way of example, cadmium sulfide (a red pigment); arsenic trisulfate (a yellow pigment), cobalt ammonium phosphate (a violet pigment), copper arsenite (a green pigment), and the like.

The term "pigment composition" means an aqueous composition comprising a pigment which is suitable for imparting an image onto cotton-containing fabrics. Such pigment compositions additionally comprise materials generally incorporated into such compositions in order to improve or impart one or more of the properties of the composition. For example, a pigment composition will generally include an extender in order to provide suitable viscosity to the composition. Other additives for inclusion in such compositions include, by way of example, emulsifiers, fillers, suspending agents, etc. For example, pigment compositions are typically applied onto a cotton-containing fabric as a suspension in solution in which a suspending agent is employed to form a uniform pigment composition.

Pigment compositions for use in this invention are well known in the art and are either commercially available or can be prepared by methods known per se in the art. Such pigment compositions per se form no part of this invention.

The term "printing" refers to methods for imparting an image on cotton-containing fabrics by pigment compositions and include, by way of example, silk-screening, painting, and the like. Such methods are well known in the art and have been commercially employed.

2. Methodology

In the methods of the present invention, cotton-containing fabrics are pretreated with an aqueous cellulase formulation, preferably in an aqueous cellulase solution under conditions which result in the agitation of the cellulase solution with the fabric, prior to printing an image onto the fabric with a pigment composition. Surprisingly, if the cotton-containing fabric is merely incubated in an aqueous cellulase solution without agitation but under otherwise identical conditions, the resulting fabric will show some improvements in the quality of the printed images but not as much as when an aqueous cellulase solution is employed under agitation.

Agitation suitable for use in this invention can be achieved by any mechanical and/or physical force which interacts with the cellulase solution so as to result in movement of the solution relative to the cotton-containing fabric. Such agitation can also result in fabric to fabric contact.

Agitation suitable for use in the preferred methods of this invention can be achieved, for instance, by employing a laundrometer, a rotary drum, a jig, a jet, a mercerizer, a beck, a paddle machine, a Terg-O-tometer, a continuous bleach range, continuous wash range, a washing machine (both front and top load) and the like. Other methods for achieving such agitation are well known in the art.

The agitation employed herein is either repetitive (e.g., intermittent) or continuous agitation. For example, the cellulase solution can be continuously agitated by employing a laundrometer, a jet, a top load washing machine, a Terg-O-tometer and the like. In a laundrometer, the cotton-containing fabric is loaded into stainless steel water-tight canisters along with an aqueous cellulase solution. Continuous agitation is achieved by rotation of the fixed canisters on a frame within a temperature adjustable water bath. The degree of agitation is defined by the speed at which the canisters rotate. In a preferred embodiment, canisters rotated at a speed of at least about 40 revolutions per minute (rpms) achieve the agitation effect required in the herein described methods. Laundrometers are well known in the textile art and are generally employed as laboratory equipment. Suitable laundrometers are commercially available from, for example, Custom Scientific Instruments, Inc., Cedar Knolls, N.J.

In a jet, the cotton-containing fabric, in a rope form, continuously rotates through and with the cellulase solution. Specifically, jets are based on a venturi tube in which the circular movement of liquor carries the fabric with it in a totally enclosed tubular chamber, annular in shape. The tubular chamber is filled in part with an aqueous cellulase solution and the fabric is rotated through the chamber via a lifter roller so that at any given time a portion of the fabric is being lifted upward. The venturi tube is a constriction in the annular passage through which the speed of the flow of the liquor must be increased, thus causing suction which imparts movement to the fabric. The primary flow is given by a centrifugal pump, but it is usual to incorporate also a few inclined steam jets to boost the movement of both the fabric and the liquor. The movement of the fabric through the jet, preferably at a rate of at least about 6 ft/sec, provides the agitation required in the herein described methods.

A jet is a well known apparatus found in textile mills and is generally used for the purpose of dyeing and after treating fabrics.

A Terg-O-tometer is a laboratory scale washing machine which provides accelerated results and which duplicates the action of an agitator type home washer. During operation, the washing solution can be maintained at any temperature between 25° C. and 70° C. and the speed of the agitator can be varied from approximately 80 cycles per minute (CPM) to about 200 CPM. With such speeds, the agitator will agitate the solution. Preferably, the agitator is operated at a speed of about 100 to about 150 CPM.

The Terg-O-tometer can also be used for rinsing the fabric by employing a rinse solution in the beaker, placing the fabric in this rinse solution and then operating the Terg-O-tometer.

Terg-O-tometers are commercially available from United States Testing Co., Inc., 1415 Park Avenue, Hoboken, N.J., 07030.

Repetitive agitation can be achieved by employing a jig, a mercerizer, a beck, a front load washing machine, and the like. A jig is a well known apparatus found in mills manufacturing cotton-containing fabrics and is generally used for the purpose of scouring fabrics prior to dyeing. In a jig, a defined length of cotton-containing fabric, in its open width position, is maintained on and between two rollers wherein the fabric is passed from one roller which is in the unwinding stage to a second roller which is in the winding stage. Once the unwinding/winding process is completed, the process is reversed so that the previous unwinding roll becomes the winding roll and the previous winding roll becomes the unwinding roll. This process is continuously conducted during the entire cellulase treatment time. A trough containing the cellulase solution is placed between the two rollers and the rollers are adjusted so that the cotton-containing fabric becomes immersed in the cellulase solution as it passes from one roller to the other.

Repetitive agitation is achieved in the jig by continuously rolling and unrolling the cotton-containing fabric from the rolls, preferably at a rate of speed of at least about 1 yd/sec and more preferably at least about 1.5 yd/sec so that at any given time, part of the length of the fabric is moving through the cellulase solution at this defined rate of speed. The net result of such rolling and unrolling is that at any given time a portion of the cotton-containing fabric found on the rolls is immersed in the cellulase solution and over a given period of time, all of the fabric (except for the very terminal portions found at either end of the fabric—these terminal ends are often composed of leader fabric, i.e., fabric sewn to the terminal portions of the treated fabric and which is not intended to be treated) has been immersed into the cellulase solution. Moving the fabric, preferably at a rate of speed of at least about 1 yd/sec, through the cellulase solution provides the agitation required in the herein described methods.

A mercerizer unit is similar to a jig in that the cotton-containing fabric, in its open width position, is passed through a trough of solution, e.g., cellulase solution, at a set speed. Passing the cotton-containing fabric through the trough, preferably at a speed of at least 1 yd./sec., and more preferably at a rate of at least 1.5 yd/sec, provides the agitation required in the herein described methods. The mercerizer unit operates in only one direction and the length of time the fabric is exposed to the cellulase solution can be varied by modifying the mercerizer so as to contain more than one trough. In this embodiment, the length of time the fabric is exposed in such a modified mercerizer depends on the number of troughs and the speed the fabric is moving through the troughs.

When repetitive agitation is employed, each portion of the cotton-containing fabric is preferably exposed to the cellulase solution under agitating conditions at least once every minute on average, and more preferably at least 1.5 times every minute on average. For example, when a jig is employed, this required degree of repetitive agitation can be achieved by limiting the length of the fabric so that when conducted at the requisite speed, each portion of the cotton-containing fabric is exposed to the cellulase solution under agitating conditions at least once every minute on average. When a modified mercerizer is employed, the desired degree of repetitive agitation can be achieved by adding a sufficient number of troughs appropriately spaced so that the fabric repetitively passes through different troughs.

The reaction conditions employed to treat the cotton-containing fabric include applying an aqueous cellulase formulation to the fabric, preferably by immersing the fabric in an aqueous cellulase solution, and maintaining the fabric at an elevated temperature, i.e., about 25° C. to about 70° C. and preferably about 35° C. to about 60° C., for a period of time at least about 0.1 hours and preferably from about 0.25 to 2.5 hours and most preferably from about 0.33 hours to 1 hour. When an aqueous cellulase solution is employed, the reaction employs liquor ratios of at least about 2:1 weight of liquor to weight of fabric (dry) to be treated; preferably, at least about 5:1; and most preferably, from about 5:1 to about 20:1 weight of liquor to weight of fabric.

As noted above, when an aqueous cellulase solution is employed, the fabric is generally immersed into the solution and is preferably agitated.

Additionally, the aqueous cellulase formulation is generally maintained at a pH where the cellulase possesses cellulolytic activity. In this regard, it is art recognized that cellulase activity is pH dependent. That is to say that, with all other factors being equal, a specific cellulase composition will exhibit significant cellulolytic activity within a defined pH range with optimal cellulolytic activity generally being found within a small portion of this defined range. The specific pH range for cellulolytic activity will vary with each cellulase composition. As noted above, while most cellulases will exhibit cellulolytic activity within an acidic to neutral pH profile, there are some cellulase compositions which exhibit cellulolytic activity in an alkaline pH profile.

During treatment of the cotton-containing fabrics as per this invention, it is possible for the pH of the initial cellulase formulation to be outside the range required for cellulase activity. It is further possible for the pH to change during treatment of the cotton-containing fabric, for example, by the generation of a reaction product which alters the pH of the formulation. In either event, the pH of an unbuffered cellulase solution could be outside the range required for cellulolytic activity. When this occurs, undesired reduction or cessation of cellulolytic activity in the cellulase formulation occurs. For example, if a cellulase having an acidic activity profile is employed in a neutral/alkaline unbuffered aqueous solution, then the pH of the solution will result in lower cellulolytic activity and possibly in the cessation of cellulolytic activity. On the other hand, the use of a cellulase having a neutral or alkaline pH profile in a neutral unbuffered aqueous formulation should initially provide significant cellulolytic activity.

In view of the above, the pH of the cellulase formulation should be maintained within the range required for cellulolytic activity and preferably, is maintained within ±1 pH unit of the pH maximum for the particular cellulase employed as determined by its activity against phosphoric acid swollen carboxymethylcellulose at 40° C. One means of accomplishing this is by simply adjusting the pH of the formulation as required by the addition of either an acid or a base. However, in a preferred embodiment, the pH of the formulation is preferably maintained within the desired pH range by the use of a buffer. In general, a sufficient amount of buffer is employed so as to maintain the pH of the formulation within the range wherein the employed cellulase exhibits its activity or preferably within ±1 pH unit of the pH performance maximum for the particular cellulase employed. Insofar as different cellulase compositions have different pH ranges for exhibiting cellulase activity, the specific buffer employed is selected in relationship to the specific cellulase composition employed. The buffer(s) selected for use with the cellulase composition employed can be readily determined by the skilled artisan taking into account the pH range and optimum for the cellulase composition employed as well as the pH of the cellulase formulation. Preferably, the buffer employed is one which is compatible with the cellulase composition and which will maintain the pH of the cellulase formulation within the pH range required for optimal activity. Suitable buffers include sodium citrate, ammonium acetate, sodium acetate, disodium phosphate, and any other art recognized buffers.

In general, such buffers are employed in concentrations of at least 0.005N and greater. Preferably, the concentration of the buffer in the cellulase formulation is from about 0.01 to about 0.5N, and more preferably, from about 0.02 to about 0.15N. In general, increased buffer concentrations in the cellulase formulation may cause enhanced rates of tensile strength loss of the treated cotton-containing fabric.

Additionally, in order to improve the wettability of the formulation, the aqueous cellulase formulation to be employed on the cotton fabric may contain from about 0.001 to about 5 weight percent of a surfactant.

Cotton-containing fabrics which are exposed to agitation generally develop "pills" which are small balls of cotton-containing material attached to the surface of the fabric. One of the advantages in using an aqueous cellulase solution in the methods of this invention is that agitation in an aqueous cellulase solution results in significantly reduced numbers of pills as compared to agitation in a similar solution but which does not contain cellulase. Without being limited to any theory, we believe that the pilling is indirectly related to broken surface fibers on the fabric and that during treatment of the fabric, these fibers are removed by the cellulase.

After pretreatment of the cotton-containing fabric is complete, the fabric is optionally but preferably treated in a manner to inactivate the cellulase. The so-treated fabric is then dried, generally in a conventional dryer.

In one embodiment, the step to inactivate the cellulase is a separate step from the drying step. In this embodiment, cellulase inactivation can be achieved by heating the fabric at elevated temperatures (at least 75° C.) to inactivate the enzyme. Alternatively, the fabric can be washed with hot water or other cellulase free aqueous solutions at a temperature of at least about 75° C. and preferably at from about 90° to about 100° C. to inactivate the cellulase.

In still another alternative embodiment, inactivation of the cellulase can be coupled with the drying step by employing a drying temperature and drying time sufficient to inactivate the enzyme and to dry the fabric. When the inactivation step is coupled to the drying step, the fabric is generally treated to a temperature of at least 75° C. for a period of at least 10 minutes. In this embodiment, the fabric is generally then thoroughly rinsed and dried.

In either case, after drying, the fabric can then be used in printing processes such as silk-screening, painting and the like. Silk-screen processes are well known in the art and are described in, for example, Biegeleisen, The Complete Book of Silk Screen Printing Production, Dover Publications, Inc., N.Y., N.Y. (1963) which is incorporated herein by reference in its entirety.

3. Utility

The methods of this invention provide for cotton-containing fabrics with improved pigment uptake as compared to the level of pigment uptake exhibited in the same cotton-containing fabrics which were not pretreated with cellulase. Additionally, treatment of cotton-containing fabrics with cellulase also result in reduced pigment bleeding in fabrics susceptible to pigment bleeding due to the quality of the fabric and/or the quality of the pigment composition.

The improvement in pigment uptake is noticeable after printing on the fabric as well as after the fabric has been washed one or more times in an aqueous detergent composition. In this regard, improved pigment uptake in unwashed printed fabrics is found at concentrations of about 700 ppm of cellulase proteins or less and preferably at concentrations of from about 50 to about 700 ppm of cellulase.

On the other hand, improved pigment uptake in washed printed fabrics is found at concentrations of about 50 to about 2000 ppm of cellulase proteins. This latter improvement is particularly important because it shows that the pigment adheres well in the pre-treated fabric and further because it permits facile cleaning of such printed fabrics.

In regard to the above, U.S Ser. No. 07/843,590 discloses improvements in printing dye compositions onto cotton-containing fabrics by pretreating the fabrics with a cellulase composition. This application is incorporated herein by reference in its entirety.

The following examples are offered to illustrate the present invention and should not be construed in any way as limiting its scope.

EXAMPLES

The cellulase treated fabrics employed in the following examples were all treated with the described cellulase solution in a Terg-O-tometer.

During treatment, the cellulase solution containing 20 mM citrate buffer was maintained at a temperature of about 50° C.; the fabric was maintained in the Terg-O-tometer for about 120 minutes; and the speed of the agitator was approximately 200 cycles per minute (CPM). Specifically, the Terg-O-tometer is operated by filling the bath with the desired amount of water and then adjusting the temperature of the bath by use of the thermostat. Solutions having the desired concentration of cellulase proteins and other optional ingredients (e.g., buffers, surfactants, etc.) are prepared and generally heated to a temperature of about 3° C. higher than the temperature of the bath. One liter of this solution is then placed into the stainless steel container which is the washing receptacle. The container is placed in position in the wash bath. The agitator is place in the container and connected to the chuck. The machine is operated for a minute or two to bring the temperature of the solution in the container to that of the bath. The fabric to be treated is then added while the machine is in motion. The operation of the machine is continued for the desired length of time. At that point, the machine is stopped and the agitator and fabric removed. The fabric is then generally squeezed out by hand or passed through a wringer.

Terg-O-tometers are commercially available from United States Testing Co., Inc., 1415 Park Avenue, Hoboken, N.J., 07030.

Example 1

This example evaluates the degree of pigment uptake in various types of cotton fabrics. In this example, each of the cotton fabrics was treated under identical conditions with an aqueous solution containing 20 mM of citrate phosphate buffer and optionally containing cellulase (i.e., Cytolase 123 cellulase available from Genencor International, Inc., South San Francisco, Calif. 94080). Additionally, after drying, images were then printed onto each of the so-treated fabrics with the same pigment composition and with the same printing methodology (i.e., silkscreening). The pigment composition contained pure pigment color, extender (including premade extender) and water.

The resulting fabrics were then evaluated by three individuals (without knowledge of the fabric origin) who rated each fabric for its degree of pigment uptake based on the depth of pigment uptake into the fabric and intensity of color. Fabrics exhibiting a deeper degree of pigment uptake throughout the fabric were evaluated as having more pigment uptake. Likewise, fabrics having a more intense color were also evaluated as having more pigment uptake. Each fabric was evaluated and compared to similar fabrics based on these factors and all of the fabrics were then ranked seriatim. The fabric with the most pigment uptake was given the lowest number and the fabric with the least pigment uptake was given the highest number.

The results of this evaluation are set forth in Tables I–IV below. In Table I, the cotton-containing fabric is a washed, resinated 100% cotton-knit fabric. In Table II, the cotton-containing fabric is a washed, non-resinated 100% cotton-knit fabric. In Table III, the cotton-containing fabric is a non-washed, resinated 100% cotton-knit fabric. In Table IV, the cotton-containing fabric is a non-washed, non-resinated cotton-knit fabric.

In Tables I and II, the washed fabrics refer to cotton-containing fabrics which were washed in a detergent composition after the pigment composition was silk-screened onto the fabric. After drying the fabric was evaluated for pigment uptake as per this example.

TABLE I

WASHED, RESINATED 100% COTTON KNIT

| AMT OF CELLULASE PROTEIN IN AQUEOUS SOLUTION (ppm) | RATING ASSIGNED TO PIGMENT UPTAKE IN A WASHED, RESINATED 100% COTTON KNIT[a] |
|---|---|
| 1000 | 2.5[b] |
| 0 | 5[b] |

TABLE II

WASHED, NON-RESINATED 100% COTTON KNIT

| AMT OF CELLULASE PROTEIN IN AQUEOUS SOLUTION (ppm) | RATING ASSIGNED TO PIGMENT UPTAKE IN A WASHED, NON-RESINATED 100% COTTON KNIT[a] |
|---|---|
| 1000 | 1 |
| 0 | 4.5[b] |

TABLE III

NON-WASHED, RESINATED 100% COTTON KNIT

| AMT OF CELLULASE PROTEINS IN AQUEOUS SOLUTION (ppm) | RATING ASSIGNED TO PIGMENT UPTAKE IN A NON-WASHED, RESINATED 100% COTTON KNIT[a] |
|---|---|
| 500 | 2.5[b] |
| 100 | 5.0[b] |
| 0 | 5.5[b] |
| 1000 | 6.5[b] |

TABLE IV

NON-WASHED, NON-RESINATED 100% COTTON KNIT

| AMT OF CELLULASE PROTEINS IN AQUEOUS SOLUTION (ppm) | RATING ASSIGNED TO PIGMENT UPTAKE IN A NON-WASHED NON-RESINATED 100% COTTON KNIT[a] |
|---|---|
| 1000 | 2 |
| 100 | 3.5[b] |
| 500 | 5.0[b] |
| 0 | 5.5[b] |

[a] = The fabrics evaluated in Tables I and II were rated together and, after combined rating, were separated into the classes defined in each of Tables I and II. The fabrics of Tables III and IV were evaluated similarly.
[b] = average of two runs The above results illustrate that pre-treating cotton fabrics as per this invention provided for improvements in the degree of pigment uptake regardless of whether the cotton-containing fabric was washed or non-washed and regardless of whether the cotton-containing fabric was resinated or non-resinated. These results also indicate that, in the case of the non-washed resinated cotton-containing knit, use of 1000 ppm cellulase does not provide observable improvements in pigment uptake as compared to the control. In any event, the improvements in pigment uptake in fabrics treated with 1000 ppm of cellulase are observed when the fabric is washed as evidenced in Table I.

In addition to pigment uptake, the fabrics of Example 1 were reviewed for pigment bleeding. However, because pigment bleeding in these fabrics were, for all intents and purposes, non-detectable, this evaluation was not made. The lack of pigment bleeding in these fabrics is ascribed to the use of a quality pigment composition, i.e., a pigment composition containing sufficient amounts of a suitable adhesive.

Example 2

Improvements in Pigment Bleeding

Pigment bleeding can be a problem with placing an image onto a cotton-containing fabric via silk-screening or painting. The problem is generally associated with the lack of sufficient and/or suitable adhesives in the pigment composition. However, certain cotton-containing fabrics are more susceptible to pigment bleeding. That is to say that some cotton-containing fabrics are more susceptible to pigment bleeding than other cotton-containing fabrics when using identical pigment compositions.

This example ascertains reductions in pigment bleeding by pre-treating cotton-containing fabrics with cellulase. The fabric employed was a resinated cotton canvas fabric. The fabric was separated into swatches of about 12 inches by 12 inches. All swatches were treated with 1000 ppm of CYTOLASE 123 cellulase (available from Genencor International, Inc., South San Francisco, Calif.) in 20 mM citrate phosphate buffer at pH 5 for 2 hours except for a 20 mM citrate phosphate treated control (i.e., treated under identical conditions except without the addition of cellulase) and a non-treated control (i.e., fabric not treated with any aqueous solution). During treatment, the swatches were agitated by use of Terg-O-tometer in the manner described in Example 1.

Each of the swatches were then used for printing using an identical pigment composition under identical conditions. After printing, the swatches were evaluated by 9 panelists for preference using the following criteria:

1. Extent of bleeding
2. Print resolution
3. Colorant uptake

The results of these evaluations are set forth in Tables V and VI. In Table V, the cellulase treated fabrics are compared to the treated control whereas in Table VI, the cellulase treated fabrics are compared to the non-treated control. The results are as follows:

TABLE V

| | Panelist Preference (in %) | | |
|---|---|---|---|
| | Fabrics Treated with Cellulase | Fabrics Treated with Buffer | No Difference |
| Reduced Bleeding | 100 | 0 | 0 |
| Improved Pigment Uptake | 67 | 11 | 22 |
| Improved Printing Resolution | 44 | 0 | 56 |

TABLE VI

| | Panelist Preference (in %) | | |
|---|---|---|---|
| | Fabrics Treated with Cellulase | Non-treated Fabrics | No Difference |
| Reduced Bleeding | 100 | 0 | 0 |
| Improved Pigment Uptake | 100 | 0 | 0 |
| Improved Printing Resolution | 100 | 0 | 0 |

These results establish that pretreatment of the cotton-containing fabric with cellulase provides for discernable improvements with regard to reduced pigment bleeding, improved pigment uptake and printing resolution as compared to the fabric either before washing or washing with an identical aqueous solution which did not contain cellulase.

Example 3

Effects of Washing on Treated Fabrics

The swatches from the previous example were then cut in half and washed with detergent then dried in a dryer. After re-washing, the swatches were again evaluated (by 8 panelists) for improved printing resolution, less pigment leaching and improved pigment retention (i.e., less fading). The results of this evaluation are set forth in Tables VII and VIII below:

TABLE VII

| | Panelist Preference (in %) | | |
|---|---|---|---|
| | Fabrics Treated with Cellulase | Fabrics Treated with Buffer | No Difference |
| Reduced Bleeding | 100 | 0 | 0 |
| Improved Pigment Retention | 0 | 33 | 67 |
| Improved Printing Resolution | 12 | 0 | 88 |

TABLE VIII

| | Panelist Preference (in %) | | |
|---|---|---|---|
| | Fabrics Treated with Cellulase | Non-treated Fabrics | No Difference |
| Reduced Bleeding | 100 | 0 | 0 |
| Improved Pigment Retention | 100 | 0 | 0 |
| Improved Printing Resolution | 75 | 0 | 25 |

The above results indicate that, after washing the fabric, discernible improvements are still evident in both reduced bleeding and improved printing resolution but that improved pigment retention are not evident for the cellulase treated fabric as compared to buffer control while it is still evident for cellulase treated fabric as compared to non-treated fabric.

While these results regarding improved pigment retention in Table VII seem contrary to the results of Example 1 and Table VIII, it is believed that these results are anomalous results.

Example 4

Improvements in Pigment Bleeding

This example ascertains improvements in pigment bleeding by pre-treating cotton-containing fabrics with cellulase. The fabric employed was a resinated cotton interlock knit. The fabric was separated into swatches of about 12 inches by 12 inches. All swatches were treated with 1000 ppm of Cytolase 123 cellulase (available from Genencor International, Inc., South San Francisco, Calif.) in 20 mM citrate phosphate buffer at pH 5 for 2 hours except for a 20 mM citrate phosphate wash control (i.e., treated under identical conditions except without the addition of cellulase) and a non-washed control. During treatment, the swatches were agitated in a Terg-O-tometer as in the manner of Example 1 above.

Each of the swatches were then used for printing employing an identical pigment composition under identical conditions. After printing, the swatches were evaluated by 11 panelists for preference using the same criteria as noted in Example 2 above.

The results of these evaluations are set forth in Tables IX and X as follows:

TABLE IX

| | Panelist Preference (in %) | | |
|---|---|---|---|
| | Fabrics Treated with Cellulase | Fabrics Treated with Buffer | No Difference |
| Reduced Bleeding | 64 | 9 | 27 |
| Improved Colorant Uptake | 82 | 0 | 18 |
| Improved Printing Resolution | 73 | 9 | 18 |

TABLE X

| | Panelist Preference (in %) | | |
|---|---|---|---|
| | Fabrics Treated with Cellulase | Non-treated Fabrics | No Difference |
| Reduced Bleeding | 27 | 18 | 55 |
| Improved Colorant Uptake | 64 | 18 | 18 |
| Improved Printing Resolution | 73 | 0 | 27 |

The above results indicate that some improvements are evident in reduced bleeding, improved printing resolution and improved colorant uptake with other cotton-containing fabrics when these fabrics are pretreated with cellulase treated fabric as compared to buffer control and to the fabric prior to treatment.

Example 5

Improvements on Fabric Integrity

Swatches of cotton interlock knit fabric (the same as in Example 3) were treated in a Terg-O-tometer with a 1000 ppm cellulase in 20 mM citrate phosphate buffer in the manner described in Example 1 above. A control was also treated in a Terg-O-tometer in 20 mM citrate phosphate buffer but without cellulase. After treatment, the different swatches were evaluated. Specifically, the buffer control was pilled and had a worn look whereas the cellulase treated swatches had no pills and looked similar to the untreated swatch but appeared thinner than the untreated swatch.

In the following examples, buffers can be used in place of the citrate phosphate buffer recited above including, by way of example, ammonium acetate, sodium citrate, sodium acetate, disodium phosphate, and the like.

In the examples set forth above, cellulases can be used in place of Cytolase 123 cellulase by merely substituting such cellulases for Cytolase 123 in these examples. Such cellulases include, by way of example, CELLUCLAST (available from Novo Industry, Copenhagen, Denmark), RAPIDASE (available from Gist Brocades, N.V., Delft, Holland) and the like.

As noted above, such other cellulases include exo-cellobiohydrolase deficient and endoglucanase enriched cellulases. Methods for preparing such cellulases are set forth in U.S. patent application Ser. No. 07/770,049 the examples of which are repeated below to illustrate these methods:

Example 6

Selection for pyr4− Derivatives of *Trichoderma longibrachiatum*

The pyr4 gene encodes orotidine-5′-monophosphate decarboxylase, an enzyme required for the biosynthesis of uridine. The toxic inhibitor 5-fluoroorotic acid (FOA) is incorporated into uridine by wild-type cells and thus poisons the cells. However, cells defective in the pyr4 gene are resistant to this inhibitor but require uridine for growth. It is, therefore, possible to select for pyr4 derivative strains using FOA. In practice, spores of *Trichoderma longibrachiatum* strain RL-P37 (Sheir-Neiss, G. and Montenecourt, B. S., *Appl. Microbiol. Biotechnol.* 20, p. 46–53 (1984)) were spread on the surface of a solidified medium containing 2 mg/ml uridine and 1.2 mg/ml FOA. Spontaneous FOA-resistant colonies appeared within three to four days and it was possible to subsequently identify those FOA-resistant derivatives which required uridine for growth. In order to identify those derivatives which specifically had a defective pyr4 gene, protoplasts were generated and transformed with a plasmid containing a wild-type pyr4 gene (see Examples 8 and 9). Following transformation, protoplasts were plated on medium lacking uridine. Subsequent growth of transformed colonies demonstrated complementation of a defective pyr4 gene by the plasmid-borne pyr4 gene. In this way, strain GC69 was identified as a pyr4− derivative of strain RL-P37.

Example 7

Preparation of CBHI Deletion Vector

A cbh1 gene encoding the CBHI protein was cloned from the genomic DNA of *Trichoderma longibrachiatum* strain RL-P37 by hybridization with an oligonucleotide probe designed on the basis of the published sequence for this gene using known probe synthesis methods (Shoemaker et al., "Molecular Cloning of Exo-cellobiohydrolase I Derived from *T. reesei* Strain L27", Bio/Technology, 1:691, 1983). The cbh1 gene resides on a 6.5 kb PstI fragment and was inserted into PstI cut pUC4K (purchased from Pharmacia Inc., Piscataway, N.J.) replacing the Kan$^r$ gene of this vector using techniques known in the art, which techniques are set forth in Maniatis et al., Molecular Cloning, A Laboratory Manual, Second Edition, Cold Spring Harbor Laboratory Press, (1989) and incorporated herein by reference. The resulting plasmid, pUC4K::cbh1 was then cut with HindIII and the larger fragment of about 6 kb was isolated and religated to give pUC4K::cbh1ΔH/H (see FIG. 1). This procedure removes the entire cbh1 coding sequence and approximately 1.2 kb upstream and 1.5 kb downstream of flanking sequences. Approximately, 1 kb of flanking DNA from either end of the original PstI fragment remains.

The *Trichoderma longibrachiatum* pyr4 gene was cloned as a 6.5 kb HindIII fragment of genomic DNA in pUC18 to form pTpyr2 (Smith et al., "Sequence of the Cloned pyr4 gene of *T. reesei* and its use as a Homologous Selectable Marker for Transformation", Current Genetics, 19:27–33 1991) following the methods of Maniatis et al., supra. The plasmid pUC4K::cbhIΔH/H was cut with HindIII and the ends were dephosphorylated with calf intestinal alkaline phosphatase. This end dephosphorylated DNA was ligated with the 6.5 kb HindIII fragment containing the *Trichoderma longibrachiatum* pyr4 gene to give pΔCBHIpyr4. FIG. 1 illustrates the construction of this plasmid.

Example 8

Isolation of Protoplasts

Mycelium was obtained by inoculating 100 ml of YEG (0.5% yeast extract, 2% glucose) in a 500 ml flask with about $5\times10^7$ *Trichoderma longibrachiatum* GC69 spores (the pyr4 derivative strain). The flask was then incubated at 37° C. with shaking for about 16 hours. The mycelium was harvested by centrifugation at 2,750×g. The harvested mycelium was further washed in a 1.2M sorbitol solution and resuspended in 40 ml of a solution containing 5 mg/ml Novozym$^R$ 234 solution (which is the tradename for a multicomponent enzyme system containing 1,3-alpha-glucanase, 1,3-beta-glucanase, laminarinase, xylanase, chitinase and protease from Novo Biolabs, Danbury, Conn.); 5 mg/ml $MgSO_4.7H_2O$; 0.5 mg/ml bovine serum albumin; 1.2M sorbitol. The protoplasts were removed from the cellular debris by filtration through Miracloth (Calbiochem Corp, La Jolla, Calif.) and collected by centrifugation at 2,000×g. The protoplasts were washed three times in 1.2M sorbitol and once in 1.2M sorbitol, 50 mM $CaCl_2$, centrifuged and resuspended at a density of approximately $2\times10^8$ protoplasts per ml of 1.2M sorbitol, 50 mM $CaCl_2$.

Example 9

Transformation of Fungal Protoplasts with pΔCBHIpyr4

200 μl of the protoplast suspension prepared in Example 8 was added to 20 μl of EcoRI digested pΔCBHIpyr4 (prepared in Example 7) in TE buffer (10 mM Tris, pH 7.4; 1 mM EDTA) and 50 μl of a polyethylene glycol (PEG) solution containing 25% PEG 4000, 0.6M KCl and 50 mM $CaCl_2$. This mixture was incubated on ice for 20 minutes. After this incubation period 2.0 ml of the above-identified PEG solution was added thereto, the solution was further mixed and incubated at room temperature for 5 minutes. After this second incubation, 4.0 ml of a solution containing 1.2M sorbitol and 50 mM $CaCl_2$ was added thereto and this solution was further mixed. The protoplast solution was then immediately added to molten aliquots of Vogel's Medium N (3 grams sodium citrate, 5 grams $KH_2PO_4$, 2 grams $NH_4NO_3$, 0.2 grams $MgSO_4.7H_2O$, 0.1 gram $CaCl_2.2H_2O$, 5 μg α-biotin, 5 mg citric acid, 5 mg $ZnSO_4.7H_2O$, 1 mg $Fe(NH4)_2.6H_2O$, 0.25 mg $CuSO_4.5H_2O$, 50 μg MnSO4.4H2O per liter) containing an additional 1% glucose, 1.2M sorbitol and 1% agarose. The protoplast-/medium mixture was then poured onto a solid medium containing the same Vogel's medium as stated above. No uridine was present in the medium and therefore only transformed colonies were able to grow as a result of complementation of the pyr4 mutation of strain GC69 by the wild type pyr4 gene insert in pΔCBHIpyr4. These colonies were subsequently transferred and purified on a solid Vogel's medium N containing as an additive, 1% glucose and stable transformants were chosen for further analysis.

At this stage stable transformants were distinguished from unstable transformants by their faster growth rate and formation of circular colonies with a smooth, rather than ragged outline on solid culture medium lacking uridine. In some cases a further test of stability was made by growing the transformants on solid non-selective medium (i.e. containing uridine), harvesting spores from this medium and determining the percentage of these spores which will subsequently germinate and grow on selective medium lacking uridine.

Example 10

Analysis of the Transformants

DNA was isolated from the transformants obtained in Example 9 after they were grown in liquid Vogel's medium N containing 1% glucose. These transformant DNA samples were further cut with a PstI restriction enzyme and subjected to agarose gel electrophoresis. The gel was then blotted onto a Nytran membrane filter and hybridized with a $^{32}P$ labelled pΔCBHIpyr4 probe. The probe was selected to identify the native cbh1 gene as a 6.5 kb PstI fragment, the native pyr4 gene and any DNA sequences derived from the transforming DNA fragment.

Figure 2:
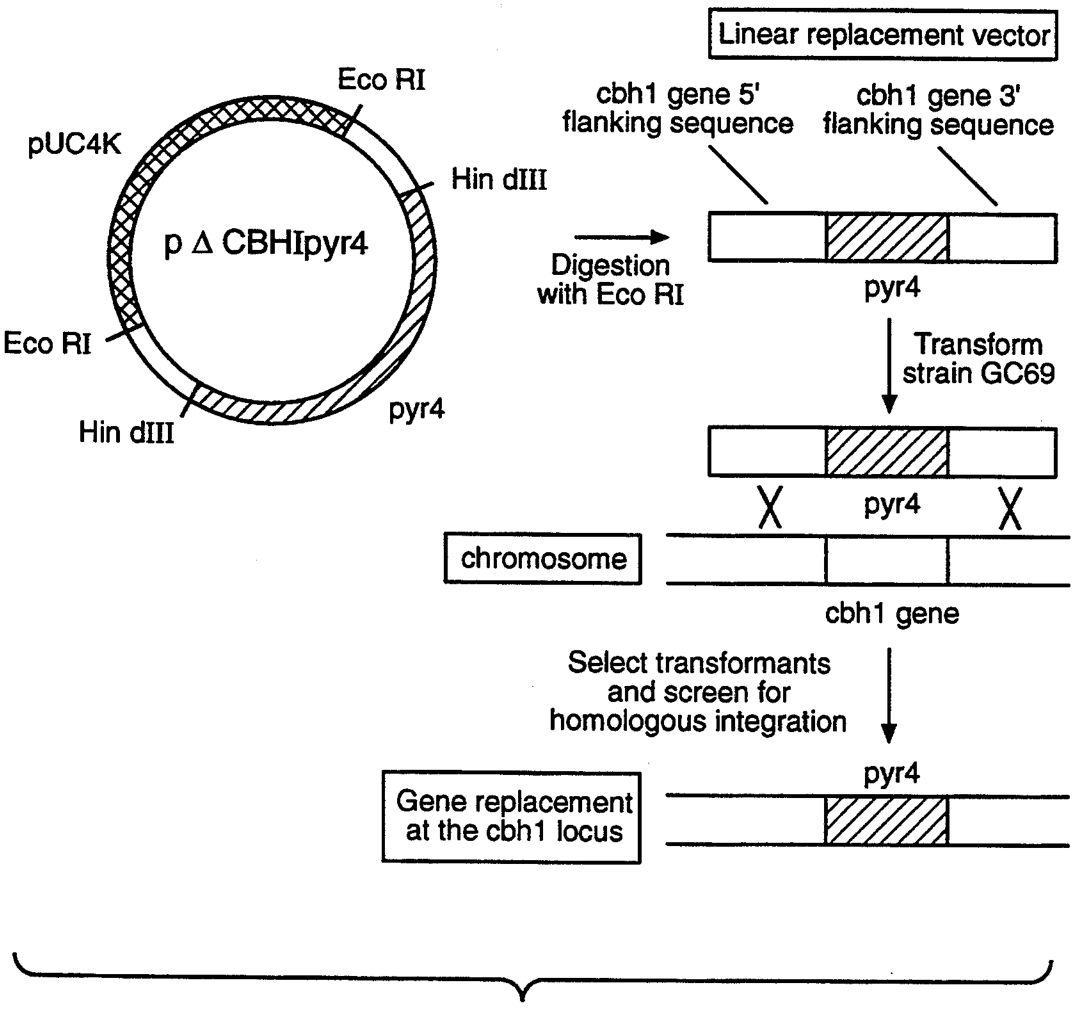
FIG. 2 illustrates deletion of the *Trichoderma longibrachiatum* gene by integration of the larger EcoRI fragment from pΔCBHIpyr4 at the cbh1 locus on one of the *Trichoderma longibrachiatum* chromosomes.
Figure 3:
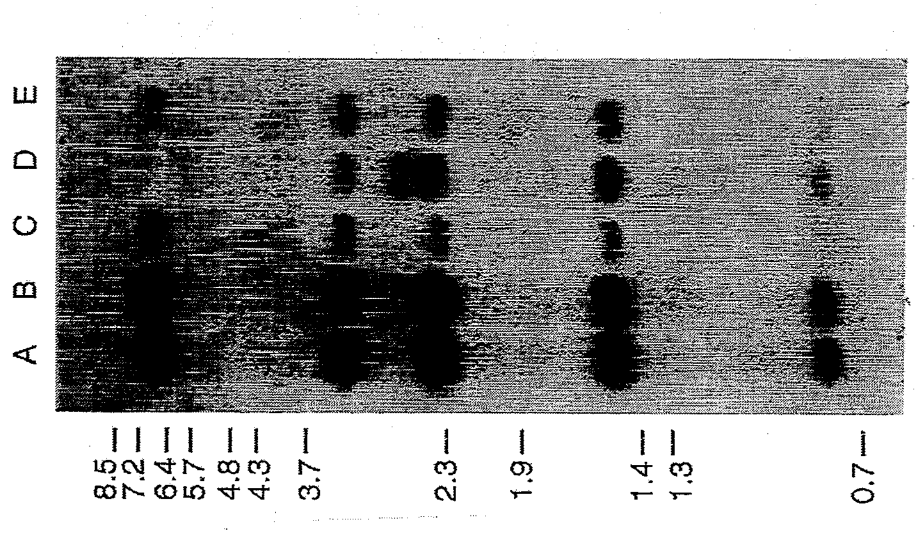
FIG. 3 is an autoradiograph of DNA from *Trichoderma longibrachiatum* strain GC69 transformed with EcoRI digested pΔCBHIpyr4 after Southern blot analysis using a $^{32}P$ labelled pΔCBHIpyr4 as the probe. The sizes of molecular weight markers are shown in kilobase pairs to the left of the Figure.

The radioactive bands from the hybridization were visualized by autoradiography. The autoradiograph is seen in FIG. 3. Five samples were run as described above, hence samples A, B, C, D, and E. Lane E is the untransformed strain GC69 and was used as a control in the present analysis. Lanes A–D represent transformants obtained by the methods described above. The numbers on the side of the autoradiograph represent the sizes of molecular weight markers. As can be seen from this autoradiograph, lane D does not contain the 6.5 kb CBHI band, indicating that this gene has been totally deleted in the transformant by integration of the DNA fragment at the cbh1 gene. The cbh1 deleted strain is called P37PΔCBHI. FIG. 2 outlines the deletion of the *Trichoderma longibrachiatum* cbh1 gene by integration through a double cross-over event of the larger EcoRI fragment from pΔCBHIpyr4 at the cbh1 locus on one of the *Trichoderma longibrachiatum* chromosomes. The other transformants analyzed appear identical to the untransformed control strain.

Example 11

Analysis of the Transformants with pIntCBHI

Figure 4:
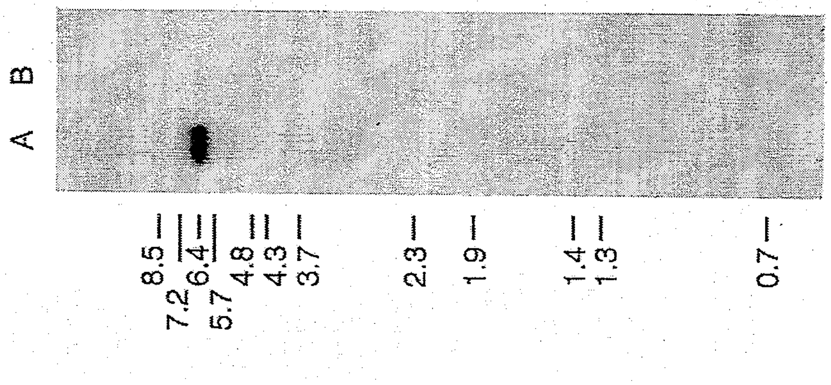
FIG. 4 is an autoradiograph of DNA from a *Trichoderma longibrachiatum* strain GC69 transformed with EcoRI digested pΔCBHIpyr4 using a $^{32}P$ labelled pIntCBHI as the probe. The sizes of molecular weight markers are shown in kilobase pairs to the left of the Figure.

The same procedure was used in this example as in Example 10, except that the probe used was changed to a $^{32}P$ labelled pIntCBHI probe. This probe is a pUC-type plasmid containing a 2 kb BglII fragment from the cbh1 locus within the region that was deleted in pUC4K::cbh1ΔH/H. Two samples were run in this example including a control, sample A, which is the untransformed strain GC69 and the transformant P37PΔCBHI, sample B. As can be seen in FIG. 4, sample A contained the cbh1 gene, as indicated by the band at 6.5 kb; however the transformant, sample B, does not contain this 6.5 kb band and therefore does not contain the cbh1 gene and does not contain any sequences derived from the pUC plasmid.

Example 12

Protein Secretion by Strain P37PΔCBHI

Spores from the produced P37PΔCBHI strain were inoculated into 50 ml of a Trichoderma basal medium containing 1% glucose, 0.14% $(NH_4)_2SO_4$, 0.2% $KH_2PO_4$, 0.03% $MgSO_4$, 0.03% urea, 0.75% bactotryptone, 0.05% Tween 80, 0.000016% $CuSO_4.5H_2O$, 0.001% $FeSO_4.7H_2O$, 0.000128% $ZnSO_4.7H_2O$, 0.0000054% $Na_2MoO_4.2H_2O$, 0.0000007%

Figure 5:
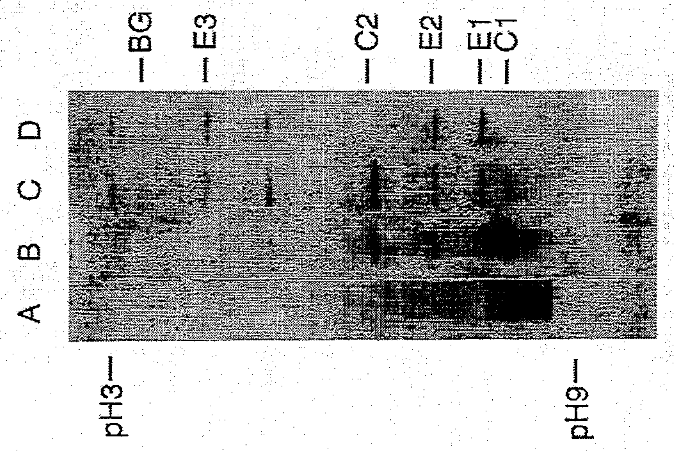
FIG. 5 is an isoelectric focusing gel displaying the proteins secreted by the wild type and by transformed strains of *Trichoderma longibrachiatum.* Specifically, in FIG. 5, Lane A of the isoelectric focusing gel employs partially purified CBHI from *Trichoderma longibrachiatum;* Lane B employs a wild type *Trichoderma longibrachiatum:* Lane C employs protein from a *Trichoderma longibrachiatum* strain with the cbh1 gene deleted; and Lane D employs protein from a *Trichoderma longibrachiatum* strain with the cbh1 and cbh2 genes deleted.

$MnCl.4H_2O$). The medium was incubated with shaking in a 250 ml flask at 37° C. for about 48 hours. The resulting mycelium was collected by filtering through Miracloth (Calbiochem Corp.) and washed two or three times with 17 mM potassium phosphate. The mycelium was finally suspended in 17 mM potassium phosphate with 1 mM sophorose and further incubated for 24 hours at 30° C. with shaking. The supernatant was then collected from these cultures and the mycelium was discarded. Samples of the culture supernatant were analyzed by isoelectric focusing using a Pharmacia Phastgel system and pH 3–9 precast gels according to the manufacturer's instructions. The gel was stained with silver stain to visualize the protein bands. The band corresponding to the cbh1 protein was absent from the sample derived from the strain P37PΔCBHI, as shown in FIG. 5. This isoelectric focusing gel shows various proteins in different supernatant cultures of *Trichoderma longibrachiatum.* Lane A is partially purified CBHI; Lane B is the supernatant from an untransformed *Trichoderma longibrachiatum* culture; Lane C is the supernatant from strain P37PΔCBHI produced according to the methods of the present invention. The position of various cellulase components are labelled CBHI, CBHII, EGI, EGII, and EGIII. Since CBHI constitutes 50% of the total extracellular protein, it is the major secreted protein and hence is the darkest band on the gel. This isoelectric focusing gel clearly shows depletion of the CBHI protein in the P37PΔCBHI strain.

Example 13

Preparation of pPΔCBHII

Figure 6A:
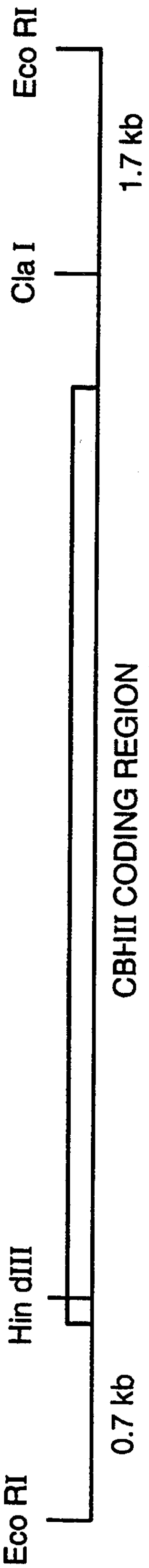
FIG. 6A is a representation of the *Trichoderma longibrachiatum* cbh2 locus, cloned as a 4.1 kb EcoRI fragment on genomic DNA
Figure 6B:
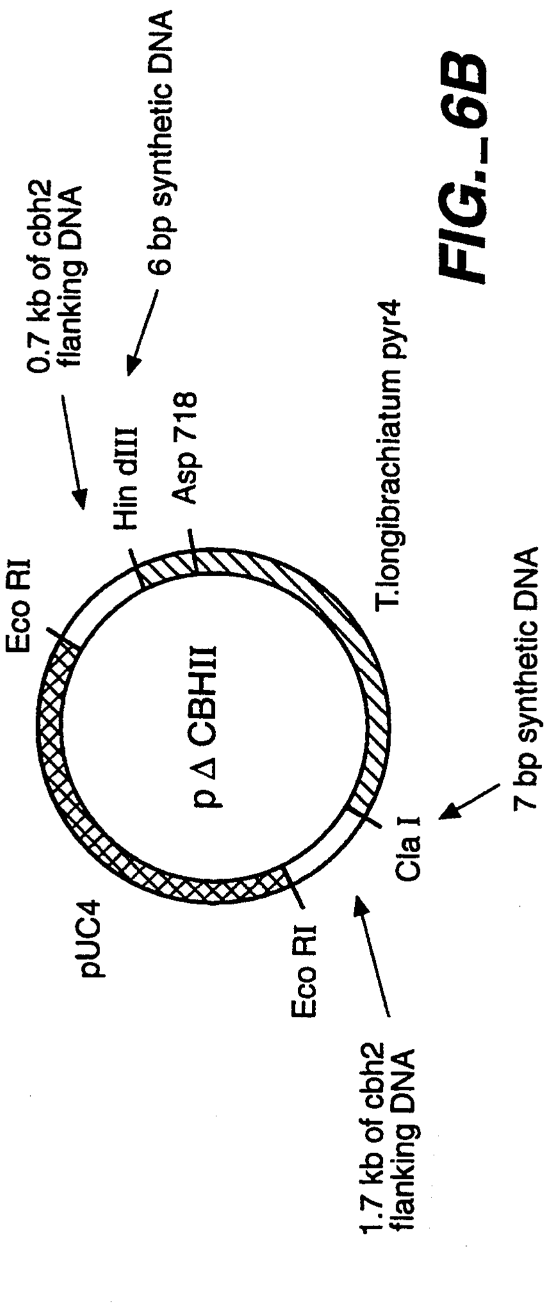
FIG. 6B is a representation of the cbh2 gene deletion vector pPΔCBHII.

The cbh2 gene of *Trichoderma longibrachiatum,* encoding the CBHII protein, has been cloned as a 4.1 kb EcoRI fragment of genomic DNA which is shown diagrammatically in FIG. 6A (Chen et al., 1987, *Biotechnology,* 5:274–278). This 4.1 kb fragment was inserted between the EcoRI sites of pUC4XL. The latter plasmid is a pUC derivative (constructed by R. M. Berka, Genencor International Inc.) which contains a multiple cloning site with a symmetrical pattern of restriction endonuclease sites arranged in the order shown here: EcoRI, BamHI, SacI, SmaI, HindIII, XhoI, BglII, ClaI, BglII, XhoI, HindIII, SmaI, SacI, BamHI, EcoRI. Using methods known in the art, a plasmid, pPΔCBHII (FIG. 6B), has been constructed in which a 1.7 kb central region of this gene between a HindIII site (at 74 bp 3′ of the CBHII translation initiation site) and a ClaI site (at 265 bp 3′ of the last codon of CBHII) has been removed and replaced by a 1.6 kb HindIII— ClaI DNA fragment containing the *Trichoderma longibrachiatum* pyr4 gene.

The *Trichoderma longibrachiatum* pyr4 gene was excised from pTpyr2 (see Example 7) on a 1.6 kb NheI—SphI fragment and inserted between the SphI and XbaI sites of pUC219 (see Example 21) to create p219M (Smith et al., 1991, *Curr. Genet* 9 p. 27–33). The pyr4 gene was then removed as a HindIII—ClaI fragment having seven bp of DNA at one end and six bp of DNA at the other end derived from the pUC219 multiple cloning site and inserted into the HindIII and ClaI sites of the cbh2 gene to form the plasmid pPΔCBHII (see FIG. 6B).

Digestion of this plasmid with EcoRI will liberate a fragment having 0.7 kb of flanking DNA from the cbh2 locus at one end, 1.7 kb of flanking DNA from the cbh2 locus at the other end and the *Trichoderma longibrachiatum* pyr4 gene in the middle.

Example 14

Deletion of the cbh2 Gene in *Trichoderma longibrachiatum* Strain GC69

Protoplasts of strain GC69 will be generated and transformed with EcoRI digested pPΔCBHII according to the methods outlined in Examples 8 and 9. DNA from the transformants will be digested with EcoRI and Asp718, and subjected to agarose gel electrophoresis. The DNA from the gel will be blotted to a membrane filter and hybridized with $^{32}P$ labelled pPΔCBHII according to the methods in Example 16. Transformants will be identified which have a single copy of the EcoRI fragment from pPΔCBHII integrated precisely at the cbh2 locus. The transformants will also be grown in shaker flasks as in Example 12 and the protein in the culture supernatants examined by isoelectric focusing. In this manner *Trichoderma longibrachiatum* GC69 transformants which do not produce the CBHII protein will be generated.

Example 15

Generation of a pyr4− Derivative of P37PΔCBHI

Spores of the transformant (P37PΔCBHI) which was deleted for the cbh1 gene were spread onto medium containing FOA. A pyr4− derivative of this transformant was subsequently obtained using the methods of Example 6. This pyr4− strain was designated P37PΔCBHIPyr−26.

Example 16

Deletion of the cbh2 Gene in a Strain Previously Deleted for cbh1

Protoplasts of strain P37PΔCBHIPyr−26 were generated and transformed with EcoRI digested pPΔCBHII according to the methods outlined in Examples 8 and 9.

Purified stable transformants were cultured in shaker flasks as in Example 12 and the protein in the culture supernatants was examined by isoelectric focusing. One transformant (designated P37PΔΔCBH67) was identified which did not produce any CBHII protein. Lane D of FIG. 5 shows the supernatant from a transformant deleted for both the cbh1 and cbh2 genes produced according to the methods of the present invention.

Figure 7:
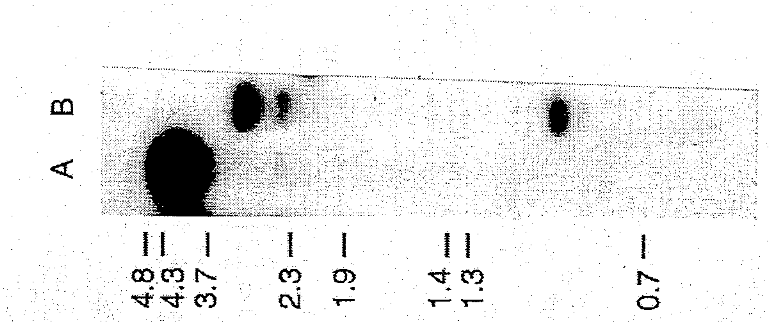
FIG. 7 is an autoradiograph of DNA from *Trichoderma longibrachiatum* strain P37PΔCBHIPyr26 transformed with EcoRI digested pPΔCBHII after Southern blot analysis using a $^{32}P$ labelled pPΔCBHII as the probe. The sizes of molecular weight markers are shown in kilobase pairs to the left of the Figure.

DNA was extracted from strain P37PΔΔCBH67, digested with EcoRI and Asp718, and subjected to agarose gel electrophoresis. The DNA from this gel was blotted to a membrane filter and hybridized with $^{32}P$ labelled pPΔCBHII (FIG. 7). Lane A of FIG. 7 shows the hybridization pattern observed for DNA from an untransformed *Trichoderma longibrachiatum* strain. The 4.1 kb EcoRI fragment containing the wild-type cbh2 gene was observed. Lane B shows the hybridization pattern observed for strain P37PΔΔCBH67. The single 4.1 kb band has been eliminated and replaced by two bands of approximately 0.9 and 3.1 kb. This is the expected pattern if a single copy of the EcoRI fragment from pPΔCBHII had integrated precisely at the cbh2 locus.

The same DNA samples were also digested with EcoRI and Southern blot analysis was performed as above. In this Example, the probe was $^{32}P$ labelled pIntCBHII. This plasmid contains a portion of the cbh2 gene coding sequence from within that segment of the cbh2 gene which was deleted in plasmid pPΔCBHII. No hybridization was seen with DNA from strain P37PΔΔCBH67 showing that the cbh2 gene was deleted and that no sequences derived from the pUC plasmid were present in this strain.

Example 17

Construction of pEGIpyr4

Figures 8, 9:
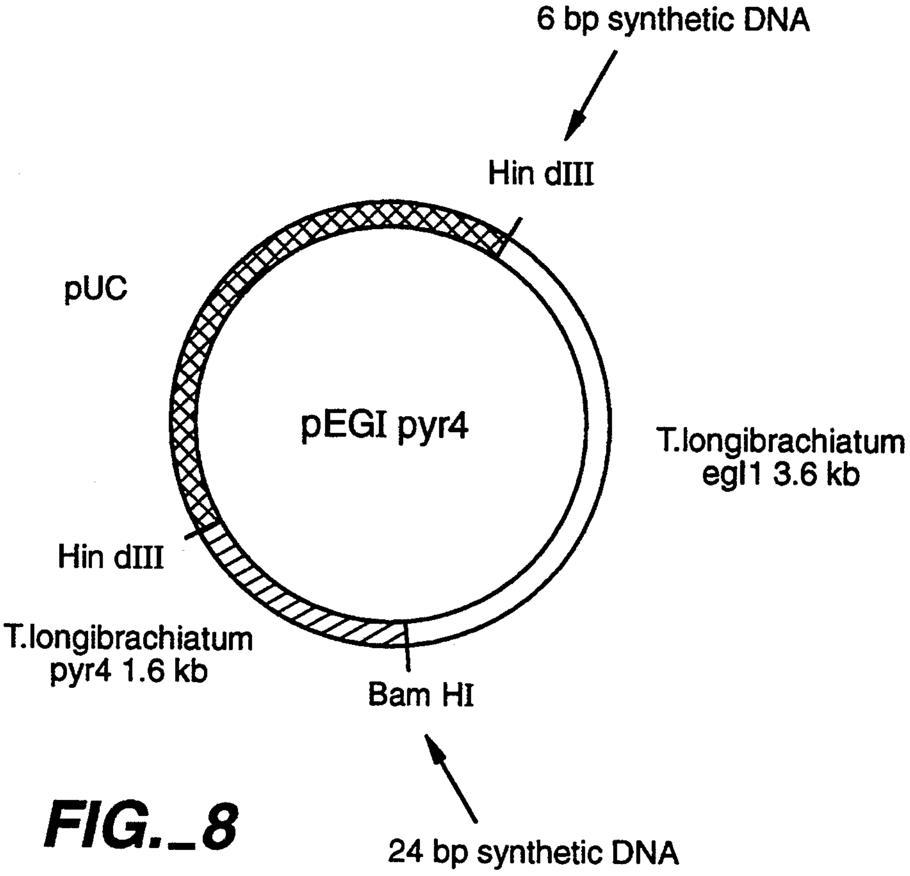
FIG. 8 is a diagram of the plasmid pEGIpyr4.
FIG. 9 is a diagram of the site specific alterations made in the egl1 and cbh1 genes to create convenient restriction endonuclease cleavage sites. In each case, the upper line shows the original DNA sequence (SEQ ID NOS: 1 and 3), the changes introduced are shown in the middle line, and the new sequence (SEQ ID NOS: 2 and 4) is shown in the lower line.

The *Trichoderma longibrachiatum* egl1 gene, which encodes EGI, has been cloned as a 4.2 kb HindIII fragment of genomic DNA from strain RL-P37 by hybridization with oligonucleotides synthesized according to the published sequence (Penttila et al., 1986, Gene 45:253–263; van Arsdell et al., 1987, *Bio/Technology* 5:60–64). A 3.6 kb HindIII—BamHI fragment was taken from this clone and ligated with a 1.6 kb HindIII—BamHI fragment containing the *Trichoderma longibrachiatum* pyr4 gene obtained from pTpyr2 (see Example 7) and pUC218 (identical to pUC219, see Example 21, but with the multiple cloning site in the opposite orientation) cut with HindIII to give the plasmid pEGIpyr4 (FIG. 8). Digestion of pEGIpyr4 with HindIII would liberate a fragment of DNA containing only *Trichoderma longibrachiatum* genomic DNA (the egl1 and pyr4 genes) except for 24 bp of sequenced, synthetic DNA between the two genes and 6 bp of sequenced, synthetic DNA at one end (see FIG. 8).

Example 18

Transformants of *Trichoderma longibrachiatum* Containing the Plasmid pEGIpyr4

A pyr4 defective derivative of *Trichoderma longibrachiatum* strain RutC30 (Sheir-Neiss and Montenecourt (1984), *Appl. Microbiol. Biotechnol.* 20:46–53) was obtained by the method outlined in Example 6. Protoplasts of this strain were transformed with undigested pEGIpyr4 and stable transformants were purified.

Five of these transformants (designated EP2, EP4, EP5, EP6, EP11), as well as untransformed RutC30 were inoculated into 50 ml of YEG medium (yeast extract, 5 g/l; glucose, 20 g/l) in 250 ml shake flasks and cultured with shaking for two days at 28° C. The resulting mycelium was washed with sterile water and added to 50 ml of TSF medium (0.05M citrate-phosphate buffer, pH 5.0; Avicel microcrystalline cellulose, 10 g/l; $KH_2PO_4$, 2.0 g/l; $(NH_4)_2SO_4$, 1.4 g/l; proteose peptone, 1.0 g/l; Urea, 0.3 g/l; $MgSO_4.7H_2O$, 0.3 g/l; $CaCl_2$, 0.3 g/l; $FeSO_4.7H_2O$, 5.0 mg/l; $MnSO_4.H_2O$, 1.6 mg/l; $ZnSO_4$, 1.4 mg/l; $CoCl_2$, 2.0 mg/l; 0.1% Tween 80). These cultures were incubated with shaking for a further four days at 28° C. Samples of the supernatant were taken from these cultures and assays designed to measure the total amount of protein and of endoglucanase activity were performed as described below.

The endoglucanase assay relied on the release of soluble, dyed oligosaccharides from Remazol Brilliant Blue-carboxymethylcellulose (RBB-CMC, obtained from MegaZyme, North Rocks, NSW, Australia). The substrate was prepared by adding 2 g of dry RBB-CMC to 80 ml of just boiled deionized water with vigorous stirring. When cooled to room temperature, 5 ml of 2M sodium acetate buffer (pH 4.8) was added and the pH adjusted to 4.5. The volume was finally adjusted to 100 ml with deionized water and sodium azide added to a final concentration of 0.02%. Aliquots of *Trichoderma longibrachiatum* control culture, pEGIpyr4 transformant culture supernatant or 0.1M sodium acetate as a blank (10–20 μl) were placed in tubes, 250 μl of substrate was added and the tubes were incubated for 30 minutes at 37° C. The tubes were placed on ice for 10 minutes and 1 ml of cold precipitant (3.3% sodium acetate, 0.4% zinc acetate, pH 5 with HCl, 76% ethanol) was then added. The tubes were vortexed and allowed to sit for five minutes before centrifuging for three minutes at approximately 13,000×g. The optical density was measured spectrophotometrically at a wavelength of 590–600 nm.

The protein assay used was the BCA (bicinchoninic acid) assay using reagents obtained from Pierce, Rockford, Ill., USA. The standard was bovine serum albumin (BSA). BCA reagent was made by mixing 1 part of reagent B with 50 parts of reagent A. One ml of the BCA reagent was mixed with 50 μl of appropriately diluted BSA or test culture supernatant. Incubation was for 30 minutes at 37° C. and the optical density was finally measured spectrophotometrically at a wavelength of 562 nm.

The results of the assays described above are shown in Table 1. It is clear that some of the transformants produced increased amounts of endoglucanase activity compared to untransformed strain RutC30. It is thought that the endoglucanases and exo-cellobiohydrolases produced by untransformed *Trichoderma longibrachiatum* constitute approximately 20 and 70 percent respectively of the total amount of protein secreted. Therefore a transformant such as EP5, which produces approximately four-fold more endoglucanase than strain RutC30, would be expected to secrete approximately equal amounts of endoglucanase-type and exo-cellobiohydrolase-type proteins.

The transformants described in this Example were obtained using intact pEGIpyr4 and will contain DNA sequences integrated in the genome which were derived from the pUC plasmid. Prior to transformation it would be possible to digest pEGIpyr4 with HindIII and isolate the larger DNA fragment containing only *Trichoderma longibrachiatum* DNA. Transformation of *Trichoderma longibrachiatum* with this isolated fragment of DNA would allow isolation of transformants which overproduced EGI and contained no heterologous DNA sequences except for the two short pieces of synthetic DNA shown in FIG. 8. It would also be possible to use pEGIpyr4 to transform a strain which was deleted for either the cbh1 gene, or the cbh2 gene, or for both genes. In this way a strain could be constructed which would over-produce EGI and produce either a limited range of, or no, exo-cellobiohydrolases.

The methods of Example 18 could be used to produce *Trichoderma longibrachiatum* strains which would overproduce any of the other cellulase components, xylanase components or other proteins normally produced by *Trichoderma longibrachiatum*.

TABLE 1

Secreted Endoglucanase Activity of *Trichoderma longibrachiatum* Transformants

| STRAIN | A ENDOGLUCANASE ACTIVITY (O.D. AT 590 nm) | B PROTEIN (mg/ml) | A/B |
|---|---|---|---|
| RutC30 | 0.32 | 4.1 | 0.078 |
| EP2 | 0.70 | 3.7 | 0.189 |
| EP4 | 0.76 | 3.65 | 0.208 |
| EP5 | 1.24 | 4.1 | 0.302 |
| EP6 | 0.52 | 2.93 | 0.177 |
| EP11 | 0.99 | 4.11 | 0.241 |

The above results are presented for the purpose of demonstrating the overproduction of the EGI component relative to total protein and not for the purpose of demonstrating the extent of overproduction. In this regard, the extent of overproduction is expected to vary with each experiment.

Example 19

Construction of pCEPC1

A plasmid, pCEPC1, was constructed in which the coding sequence for EGI was functionally fused to the promoter from the cbh1 gene. This was achieved using in vitro, site-specific mutagenesis to alter the DNA sequence of the cbh1 and egl1 genes (SEQ ID NOS: 1 and 3) in order to create convenient restriction endonuclease cleavage sites just 5′ (upstream) of their respective translation initiation sites. DNA sequence analysis was performed to verify the expected sequence at the junction between the two DNA segments. The specific alterations made are shown in FIG. 9 (SEQ ID NOS: 1–4).

Figure 10:
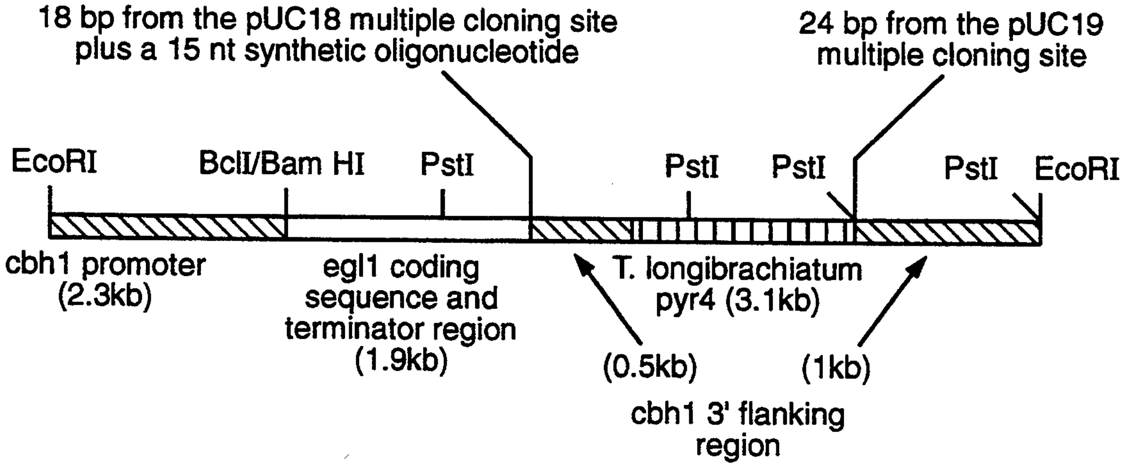
FIG. 10 is a diagram of the larger EcoRI fragment which can be obtained from pCEPC1.

The DNA fragments which were combined to form pCEPC1 were inserted between the EcoRI sites of pUC4K and were as follows (see FIG. 10):

A) A 2.1 kb fragment from the 5′ flanking region of the cbh1 locus. This includes the promoter region and extends to the engineered BclI site and so contains no cbh1 coding sequence.

B) A 1.9 kb fragment of genomic DNA from the egl1 locus starting at the 5′ end with the engineered BamHI site and extending through the coding region and including approximately 0.5 kb beyond the translation stop codon. At the 3′ end of the fragment is 18 bp derived from the pUC218 multiple cloning site and a 15 bp synthetic oligonucleotide used to link this fragment with the fragment below.

C) A fragment of DNA from the 3′ flanking region of the cbh1 locus, extending from a position approximately 1 kb downstream to approximately 2.5 kb downstream of the cbh1 translation stop codon.

D) Inserted into an NheI site in fragment (C) was a 3.1 kb NheI—SphI fragment of DNA containing the *Trichoderma longibrachiatum* pyr4 gene obtained from pTpyr2 (Example 7) and having 24 bp of DNA at one end derived from the pUC18 multiple cloning site.

The plasmid, pCEPC1 was designed so that the EGI coding sequence would be integrated at the cbh1 locus, replacing the coding sequence for CBHI without introducing any foreign DNA into the host strain. Digestion of this plasmid with EcoRI liberates a fragment which includes the cbh1 promoter region, the egl1 coding sequence and transcription termination region, the *Trichoderma longibrachiatum* pyr4 gene and a segment of DNA from the 3′ (downstream) flanking region of the cbh1 locus (see FIG. 10).

Example 20

Transformants Containing pCEPC1 DNA

Figure 11:
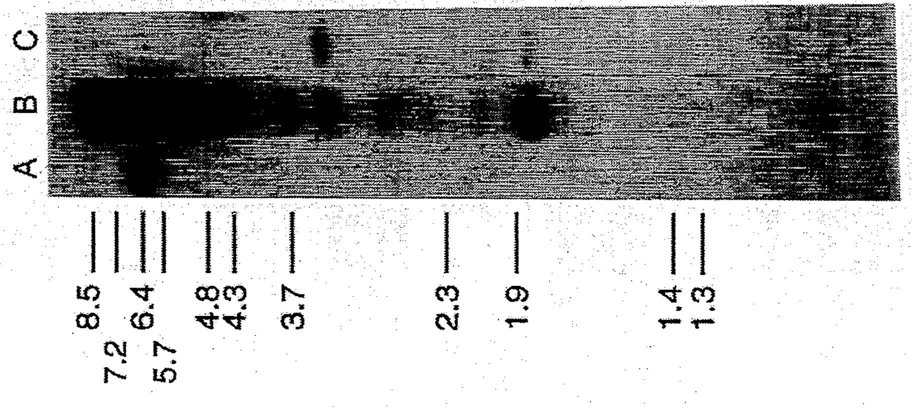
FIG. 11 is an autoradiograph of DNA, from an untransformed strain of *Trichoderma longibrachiatum* RutC30 and from two transformants obtained by transforming *Trichoderma longibrachiatum* with EcoRI digested pCEPC1. The DNA was digested with PstI, a Southern blot was obtained and hybridized with $^{32}P$ labelled pUC4K::cbh1. The sizes of marker DNA fragments are shown in kilobase pairs to the left of the Figure.

A pyr4 defective strain of *Trichoderma longibrachiatum* RutC30 (Sheir-Neiss, supra) was obtained by the method outlined in Example 6. This strain was transformed with pCEPC1 which had been digested with EcoRI. Stable transformants were selected and subsequently cultured in shaker flasks for cellulase production as described in Example 18. In order to visualize the cellulase proteins, isoelectric focusing gel electrophoresis was performed on samples from these cultures using the method described in Example 12. Of a total of 23 transformants analyzed in this manner 12 were found to produce no CBHI protein, which is the expected result of integration of the CEPC1 DNA at the cbh1 locus. Southern blot analysis was used to confirm that integration had indeed occurred at the cbh1 locus in some of these transformants and that no sequences derived from the bacterial plasmid vector (pUC4K) were present (see FIG. 11). For this analysis the DNA from the transformants was digested with PstI before being subjected to electrophoresis and blotting to a membrane filter. The resulting Southern blot was probed with radiolabelled plasmid pUC4K::cbh1 (see Example 7). The probe hybridized to the cbh1 gene on a 6.5 kb fragment of DNA from the untransformed control culture (FIG. 11, lane A). Integration of the CEPC1 fragment of DNA at the cbh1 locus would be expected to result in the loss of this 6.5 kb band and the appearance of three other bands corresponding to approximately 1.0 kb, 2.0 kb and 3.5 kb DNA fragments. This is exactly the pattern observed for the transformant shown in FIG. 11, lane C. Also shown in FIG. 11, lane B is an example of a transformant in which multiple copies of pCEPC1 have integrated at sites in the genome other than the cbh1 locus.

Endoglucanase activity assays were performed on samples of culture supernatant from the untransformed culture and the transformants exactly as described in Example 18 except that the samples were diluted 50 fold prior to the assay so that the protein concentration in the samples was between approximately 0.03 and 0.07 mg/ml. The results of assays performed with the untransformed control culture and four different transformants (designated CEPC1-101, CEPC1-103, CEPC1-105 and CEPC1-112) are shown in Table 2. Transformants CEPC1-103 and CEPC1-112 are examples in which integration of the CEPC1 fragment had led to loss of CBHI production.

TABLE 2

Secreted endoglucanase activity of *Trichoderma longibrachiatum* transformants

| STRAIN | A ENDOGLUCANASE ACTIVITY (O.D. at 590 nm) | B PROTEIN (mg/ml) | A/B |
|---|---|---|---|
| RutC300 | 0.037 | 2.38 | 0.016 |
| CEPC1-101 | 0.082 | 2.72 | 0.030 |
| CEPC1-103 | 0.099 | 1.93 | 0.051 |
| CEPC1-105 | 0.033 | 2.07 | 0.016 |
| CEPC1-112 | 0.093 | 1.72 | 0.054 |

The above results are presented for the purpose of demonstrating the overproduction of the EGI component relative to total protein and not for the purpose of demonstrating the extent of overproduction. In this regard, the extent of overproduction is expected to vary with each experiment.

It would be possible to construct plasmids similar to pCEPC1 but with any other *Trichoderma longibrachiatum* gene replacing the egl1 gene. In this way, overexpression of other genes and simultaneous deletion of the cbh1 gene could be achieved.

It would also be possible to transform pyr4 derivative strains of *Trichoderma longibrachiatum* which had previously been deleted for other genes, e.g. for cbh2, with pCEPC1 to construct transformants which would, for example, produce no exo-cellobiohydrolases and overexpress endoglucanases.

Using constructions similar to pCEPC1, but in which DNA from another locus of *Trichoderma longibrachiatum* was substituted for the DNA from the cbh1 locus, it would be possible to insert genes under the control of another promoter at another locus in the *Trichoderma longibrachiatum* genome.

Example 21

Construction of pEGII::P-1

Figure 12:
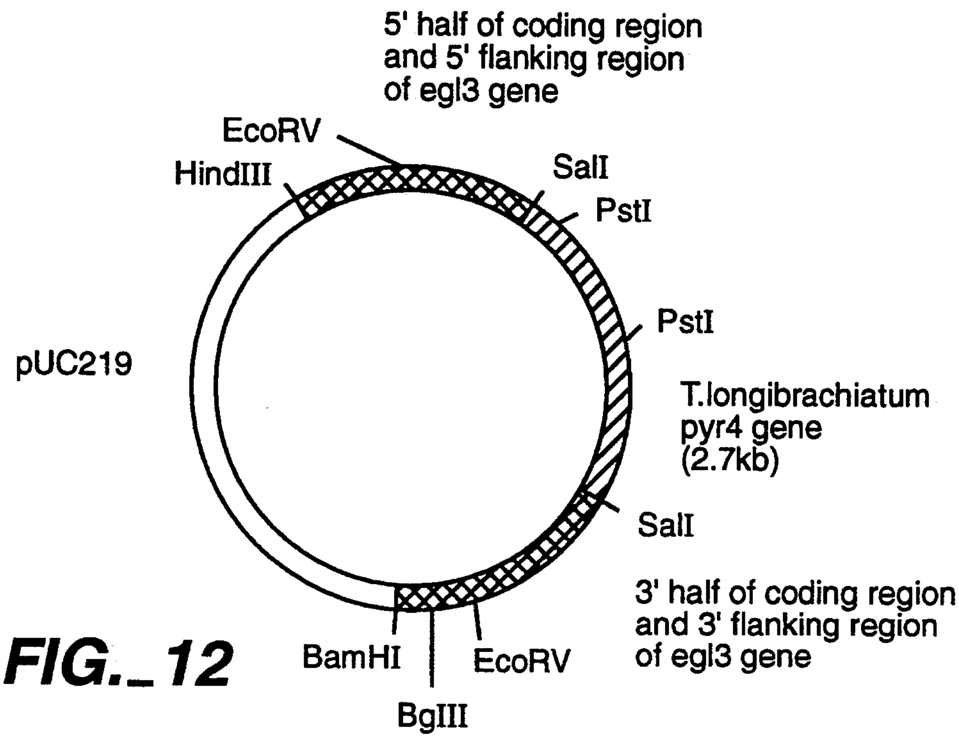
FIG. 12 is a diagram of the plasmid pEGII::P-1.

The egl3 gene, encoding EGII (previously referred to as EGIII by others), has been cloned from *Trichoderma longibrachiatum* and the DNA sequence published (Saloheimo et al., 1988, Gene 63:11–21). We have obtained the gene from strain RL-P37 as an approximately 4 kb PstI— XhoI fragment of genomic DNA inserted between the PstI and XhoI sites of pUC219. The latter vector, pUC219, is derived from pUC119 (described in Wilson et al., 1989, Gene 77:69–78) by expanding the multiple cloning site to include restriction sites for BglII, ClaI and XhoI. Using methods known in the art the *Trichoderma longibrachiatum* pyr4 gene, present on a 2.7 kb SalI fragment of genomic DNA, was inserted into a SalI site within the EGII coding sequence to create plasmid pEGII::P-1 (FIG. 12). This resulted in disruption of the EGII coding sequence but without deletion of any sequences. The plasmid, pEGII::P-1 can be digested with HindIII and BamHI to yield a linear fragment of DNA derived exclusively from *Trichoderma longibrachiatum* except for 5 bp on one end and 16 bp on the other end, both of which are derived from the multiple cloning site of pUC219.

Example 22

Transformation of *Trichoderma longibrachiatum* GC69with pEGII::P-1 to Create a Strain Unable to Produce EGII

*Trichoderma longibrachiatum* strain GC69 will be transformed with pEGII::P-1 which had been previously digested with HindIII and BamHI and stable transformants will be selected. Total DNA will be isolated from the transformants and Southern blot analysis used to identify those transformants in which the fragment of DNA containing the pyr4 and egl3 genes had integrated at the egl3 locus and consequently disrupted the EGII coding sequence. The transformants will be unable to produce EGII. It would also be possible to use pEGII::P-1 to transform a strain which was deleted for either or all of the cbh1, cbh2, or egl1 genes. In this way a strain could be constructed which would only produce certain cellulase components and no EGII component.

Example 23

Figure 13:
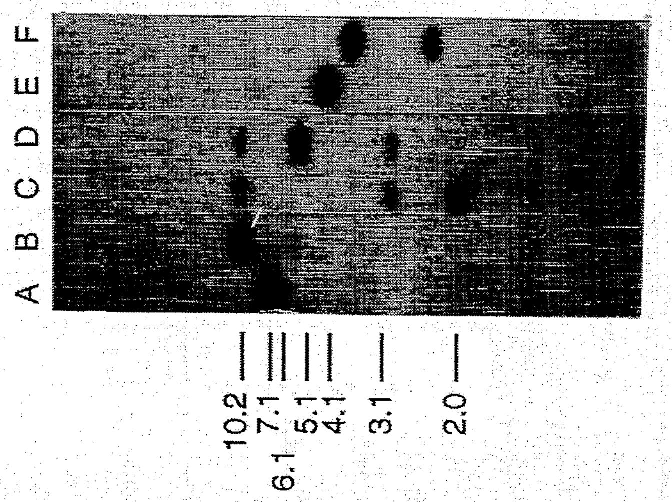
FIG. 13 is an autoradiograph of DNA from *Trichoderma longibrachiatum* strain P37PΔΔ67P−1 transformed with HindIII and BamHI digested pEGII::P-1. A Southern blot was prepared and the DNA was hybridized with an approximately 4 kb PstI fragment of radiolabelled *Trichoderma longibrachiatum* DNA containing the egl3 gene. Lanes A, C and E contain DNA from the untransformed strain whereas, Lanes B, D and F contain DNA from the untransformed *Trichoderma longibrachiatum* strain. The *Trichoderma longibrachiatum* DNA was digested with BglII in Lanes A and B, with EcoRV in Lanes C and D and with PstI in Lanes E and F. The size of marker DNA fragments are shown in kilobase pairs to the left of the Figure.

Transformation of *Trichoderma longibrachiatum* with pEGII::P-1 to Create a Strain Unable to Produce CBHI, CBHII and EGII A pyr4 deficient derivative of strain P37PΔΔCBH67 (from Example 16) was obtained by the method outlined in Example 6. This strain P37PΔΔ67P−1 was transformed with pEGII::P-1 which had been previously digested with HindIII and BamHI and stable transformants were selected. Total DNA was isolated from transformants and Southern blot analysis used to identify strains in which the fragment of DNA containing the pyr4 and egl3 genes had integrated at the egl3 locus and consequently disrupted the EGII coding sequence. The Southern blot illustrated in FIG. 13 was probed with an approximately 4 kb PstI fragment of *Trichoderma longibrachiatum* DNA containing the egl3 gene which had been cloned into the PstI site of pUC18 and subsequently re-isolated. When the DNA isolated from strain P37PΔΔ67P−1 was digested with PstI for Southern blot analysis the egl3 locus was subsequently visualized as a single 4 kb band on the autoradiograph (FIG. 13, lane E). However, for a transformant disrupted for the egl3 gene this band was lost and was replaced by two new bands as expected (FIG. 13, Lane F). If the DNA was digested with EcoRV or BglII the size of the band corresponding to the egl3 gene increased in size by approximately 2.7 kb (the size of the inserted pyr4 fragment) between the untransformed P37PΔΔ67P−1 strain (Lanes A and C) and the transformant disrupted for egl3 (FIG. 13, Lanes B and D). The transformant containing the disrupted egl3 gene illustrated in FIG. 13 (Lanes B, D and F) was named A22. The transformant identified in FIG. 13 is unable to produce CBHI, CBHII or EGII.

Example 24

Construction of pPΔEGI-1

Figure 14:
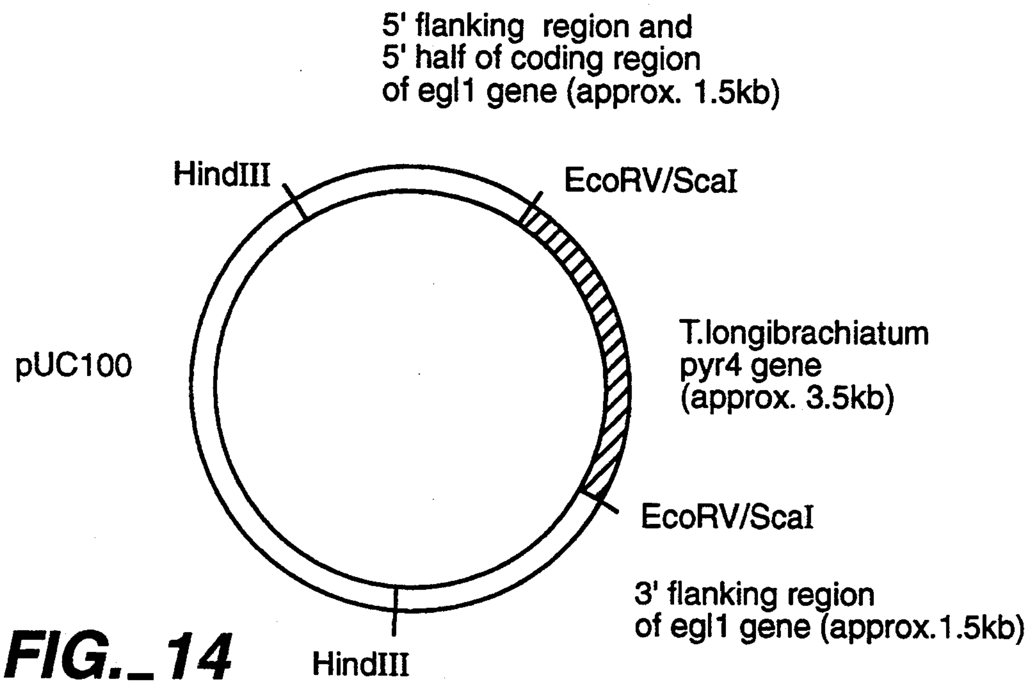
FIG. 14 is a diagram of the plasmid pPΔEGI-1.

The egl1 gene of *Trichoderma longibrachiatum* strain RL-P37 was obtained, as described in Example 17, as a 4.2 kb HindIII fragment of genomic DNA. This fragment was inserted at the HindIII site of pUC100 (a derivative of pUC18; Yanisch-Perron et al., 1985, Gene 33:103–119, with an oligonucleotide inserted into the multiple cloning site adding restriction sites for BglII, ClaI and XhoI). Using methodology known in the art an approximately 1 kb EcoRV fragment extending from a position close to the middle of the EGI coding sequence to a position beyond the 3′ end of the coding sequence was removed and replaced by a 3.5 kb ScaI fragment of *Trichoderma longibrachiatum* DNA containing the pyr4 gene. The resulting plasmid was called pPΔEGI-1 (see FIG. 14).

The plasmid pPΔEGI-1 can be digested with HindIII to release a DNA fragment comprising only *Trichoderma longibrachiatum* genomic DNA having a segment of the egl1 gene at either end and the pyr4 gene replacing part of the EGI coding sequence, in the center.

Transformation of a suitable *Trichoderma longibrachiatum* pyr4 deficient strain with the pPΔEGI-1 digested with HindIII will lead to integration of this DNA fragment at the egl1 locus in some proportion of the transformants. In this manner a strain unable to produce EGI will be obtained.

Example 25

Construction of pΔEGIpyr-3 and Transformation of a pyr4 Deficient Strain of *Trichoderma longibrachiatum*

The expectation that the EGI gene could be inactivated using the method outlined in Example 24 is strengthened by this experiment. In this case a plasmid, pΔEGIpyr-3, was constructed which was similar to pPΔEGI-1 except that the *Aspergillus niger* pyr4 gene replaced the *Trichoderma longibrachiatum* pyr4 gene as selectable marker. In this case the egl1 gene was again present as a 4.2 kb HindIII fragment inserted at the HindIII site of pUC100. The same internal 1 kb EcoRV fragment was removed as during the construction of pPΔEGI-1 (see Example 24) but in this case it was replaced by a 2.2 kb fragment containing the cloned *A.*

Figure 15:
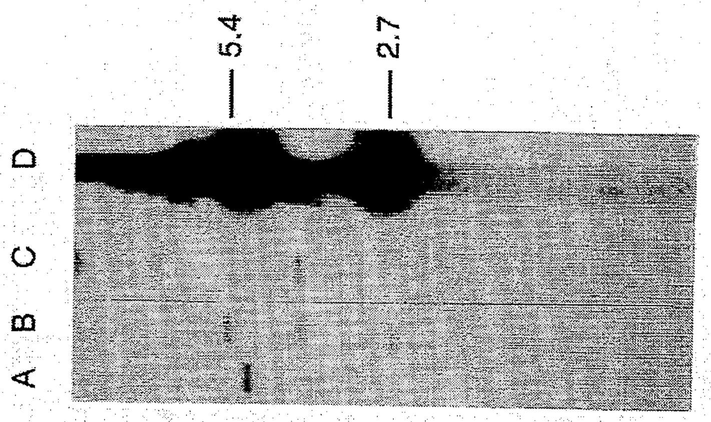
FIG. 15 is an autoradiograph of a Southern blot of DNA isolated from transformants of strain GC69 obtained with HindIII digested pΔEGIpyr-3. The pattern of hybridization with the probe, radiolabelled pΔEGIpyr-3, expected for an untransformed strain is shown in Lane C. Lane A shows the pattern expected for a transformant in which the egl1 gene has been disrupted and Lane B shows a transformant in which pΔEGIpyr-3 DNA has integrated into the genome but without disrupting the egl1 gene. Lane D contains pΔEGIpyr-3 digested with HindIII to provide appropriate size markers. The sizes of marker DNA fragments are shown in kilobase pairs to the right of the figure.

*niger* pyrG gene (Wilson et al., 1988, *Nucl. Acids Res.* 16 p.2339). Transformation of a pyr4 deficient strain of *Trichoderma longibrachiatum* (strain GC69) with pΔEGIpyr-3, after it had been digested with HindIII to release the fragment containing the pyrG gene with flanking regions from the egl1 locus at either end, led to transformants in which the egl1 gene was disrupted. These transformants were recognized by Southern blot analysis of transformant DNA digested with HindIII and probed with radiolabelled pΔEGIpyr-3. In the untransformed strain of *Trichoderma longibrachiatum* the egl1 gene was present on a 4.2 kb HindIII fragment of DNA and this pattern of hybridization is represented by FIG. 15, lane C. However, following deletion of the egl1 gene by integration of the desired fragment from pΔEGIpyr-3 this 4.2 kb fragment disappeared and was replaced by a fragment approximately 1.2 kb larger in size, FIG. 15, lane A. Also shown in FIG. 15, lane B is an example of a transformant in which integration of a single copy of pPΔEGIpyr-3 has occurred at a site in the genome other than the egl1 locus.

Example 26

Transformation of *Trichoderma longibrachiatum* with pPΔEGI-1 to Create a Strain Unable to Produce CBHI, CDHII, EGI and EGII A pyr4 deficient derivative of strain A22 (from Example 23) will be obtained by the method outlined in Example 6. This strain will be transformed with pPΔEGI-1 which had been previously digested with HindIII to release a DNA fragment comprising only *Trichoderma longibrachiatum* genomic DNA having a segment of the egl1 gene at either end with part of the EGI coding sequence replaced by the pyr4 gene.

Stable pyr4+ transformants will be selected and total DNA isolated from the transformants. The DNA will be probed with $^{32}P$ labelled pPΔEGI-1 after Southern blot analysis in order to identify transformants in which the fragment of DNA containing the egl4 gene and egl1 sequences has integrated at the egl1 locus and consequently disrupted the EGI coding sequence. The transformants identified will be unable to produce CBHI, CBHII, EGI and EGII.

What is claimed is:

1. A method for printing an image onto a cotton-containing fabric with a pigment composition which method comprises:

(a) contacting a cotton-containing fabric with an aqueous cellulase formulation comprising at least about 50 ppm of cellulase proteins selected from the group consisting of exo-cellobiohydrolase, endoglucanase, and β-glucosidase components at a temperature of from about 25° C. to about 70° C. for at least 0.1 hours wherein the aqueous formulation is maintained at a pH where the cellulase proteins have activity;

(b) inactivating the cellulase proteins from the cotton-containing fabric;

(c) drying the fabric; and (d) printing an image on the fabric with a pigment composition wherein said cotton-containing fabric is made from fibers selected from the group consisting of pure cotton and cotton blends comprising cotton and non-cotton fibers wherein at least 40 weight percent of the cotton-containing material is cotton and further wherein the non-cotton fiber is a synthetic fiber.

2. A method as described in claim 1, wherein the cellulase protein concentration in said aqueous formulation is from about 100 ppm to about 2000 ppm.

3. A method as described in claim 1 wherein the temperature of the cellulase formulation is maintained at from 35° to 60° C. for a period of time of from about 0.25 to 2.5 hours.

4. A method as described in claim 1 wherein the cellulase formulation is an aqueous cellulase solution which is agitated during contact with the cotton-containing fabric.

5. A method as described in claim 1 wherein the cellulase in the aqueous cellulase formulation is derived from a fungal source.

6. A method as described in claim 1 wherein the cellulase in the aqueous cellulase formulation is a fungal cellulase composition expressed by a naturally occurring fungal source which comprises one or more exo-cellobiohydrolase components and one or more endoglucanase components wherein the ratio of each of these components in the cellulase composition is that which is naturally produced by the fungal source.

7. A method as described in claim 1 wherein the aqueous cellulase formulation is maintained at a pH within ±1 pH unit of the pH at which the cellulase in the aqueous cellulase formulation possesses maximal activity.

8. A method as described in claim 1 wherein the cellulase is inactivated by contacting the cotton-containing fabric with hot water maintained at a temperature of from about 90° to about 100° C.

9. A method as described in claim 1 wherein said cellulase is deficient in exo-cellobiohydrolase components and enriched in endoglucanase components.

10. A cotton-containing fabric having an image placed thereon with a colorant composition which fabric is prepared in the method described in claim 1.

11. A method as described in claim 1 wherein the synthetic fiber is selected from the group consisting of polyamide fibers, acrylic fibers, polyester fibers, polyvinyl alcohol fibers, polyvinyl chloride fibers, polyvinylidene chloride fibers, polyurethane fibers, polyurea fibers, and aramid fibers.

* * * * *

SEQUENCE LISTING ( 1 ) GENERAL INFORMATION:

( i i i ) NUMBER OF SEQUENCES: 4

( 2 ) INFORMATION FOR SEQ ID NO:1:

( i ) SEQUENCE CHARACTERISTICS:
( A ) LENGTH: 38 base pairs
( B ) TYPE: nucleic acid
( C ) STRANDEDNESS: double
( D ) TOPOLOGY: linear ( x i ) SEQUENCE DESCRIPTION: SEQ ID NO:2:

AAACCCAATA GTGATCAGCG GACTGGCATA TGTATCGG ( 2 ) INFORMATION FOR SEQ NO:3:

( i ) SEQUENCE CHARACTERISTICS:
( A ) LENGTH: 31 base pairs
( B ) TYPE: nucleic acid
( C ) STRANDEDNESS: double
( D ) TOPOLOGY: linear ( x i ) SEQUENCE DESCRIPTION: SEQ ID NO:3:

TAGTCCTTCT TGTTGTCCCA AAATGGCGCC C ( 2 ) INFORMATION FOR SEQ ID NO:4:

( i ) SEQUENCE CHARACTERISTICS:
( A ) LENGTH: 31 base pairs
( B ) TYPE: nucleic acid
( C ) STRANDEDNESS: double
( D ) TOPOLOGY: linear ( x i ) SEQUENCE DESCRIPTION: SEQ ID NO:4:

TAGTCCTTCT TGGGATCCCA AAATGGCGCC C